(12) United States Patent
Lundblad et al.

(10) Patent No.: US 8,697,311 B2
(45) Date of Patent: Apr. 15, 2014

(54) ARRANGEMENT FOR INTERCONNECTING ELECTROCHEMICAL CELLS, A FUEL CELL ASSEMBLY AND METHOD OF MANUFACTURING A FUEL CELL DEVICE

(75) Inventors: Anders Lundblad, Stockholm (SE); Henrik Ekstrom, Stockholm (SE); Eric Jonsson, Grasmark (SE)

(73) Assignee: myFC AB, Stockholm (SE)

( * ) Notice: Subject to any disclaimer, the term of this patent is extended or adjusted under 35 U.S.C. 154(b) by 921 days.

(21) Appl. No.: 12/674,513

(22) PCT Filed: Aug. 20, 2008

(86) PCT No.: PCT/SE2008/050931
§ 371 (c)(1),
(2), (4) Date: Feb. 22, 2010

(87) PCT Pub. No.: WO2009/025613
PCT Pub. Date: Feb. 26, 2009

(65) Prior Publication Data
US 2011/0123893 A1    May 26, 2011

(30) Foreign Application Priority Data
Aug. 20, 2007   (SE) .................................. 0701883-1

(51) Int. Cl.
*H01M 8/02*    (2006.01)
*H01M 8/10*    (2006.01)
*H01M 8/24*    (2006.01)
*H01M 2/22*    (2006.01)

(52) U.S. Cl.
USPC ........... 429/508; 429/480; 429/511; 429/517; 429/521; 429/468; 429/469

(58) Field of Classification Search
USPC ................ 429/479–483, 507–511, 517–522, 429/452–471
See application file for complete search history.

(56) References Cited

U.S. PATENT DOCUMENTS 5,954,937 A * 9/1999 Farmer .......................... 205/687
6,197,445 B1 * 3/2001 Ward et al. .................... 429/163

(Continued)

FOREIGN PATENT DOCUMENTS

CN         1639896 A         7/2005
JP         2002056855 A  *  2/2002   ............. H01M 8/02

(Continued)

OTHER PUBLICATIONS

English Machine Translation of JP 2002-056855 (Feb. 2002).*
Translation of Chinese Office Action, dated Mar. 23, 2012, from corresponding CN application No. 2008801036821.
International Search Report, dated Dec. 10, 2008, from corresponding PCT application.

*Primary Examiner* — Jonathan Crepeau
*Assistant Examiner* — Jacob Buchanan
(74) *Attorney, Agent, or Firm* — Young & Thompson

(57) ABSTRACT

An arrangement for interconnecting electrochemical cells of the type having a membrane electrode assembly (MEA) interposed between an anode gas diffusion layer (208) and a cathode gas diffusion layer (210), and first and second current collectors coupled to said anode and cathode gas diffusion layers (GDL), respectively, wherein the first current collector extends from the anode side of one cell to the cathode side of an adjacent cell, and wherein the cell components are clamped together. The first current collector (206) which is in contact with the anode gas diffusion layer (GDL; 208) of a first electrochemical cell (200a) is configured to be connected to the cathode side of a second, adjacent electrochemical cell (200b) via an inert and electrically conductive member (204b), without being in electrochemical contact with the electrochemically active components of the adjacent cell.

15 Claims, 16 Drawing Sheets

(56) References Cited

U.S. PATENT DOCUMENTS

| | | | |
|---|---|---|---|
| 2002/0076597 A1* | 6/2002 | Chang et al. | 429/35 |
| 2002/0076598 A1* | 6/2002 | Bostaph et al. | 429/38 |
| 2004/0146772 A1* | 7/2004 | Miyao et al. | 429/38 |
| 2004/0151961 A1* | 8/2004 | Morishima et al. | 429/32 |
| 2005/0006856 A1* | 1/2005 | Cho | 277/628 |
| 2005/0026026 A1* | 2/2005 | Yen et al. | 429/36 |
| 2005/0026028 A1 | 2/2005 | Ouchi | |
| 2005/0142416 A1 | 6/2005 | Takai | |
| 2006/0024555 A1 | 2/2006 | Kohno | |
| 2006/0185242 A1* | 8/2006 | Cha et al. | 48/77 |

FOREIGN PATENT DOCUMENTS

| | | |
|---|---|---|
| WO | WO 01/97314 | 12/2001 |
| WO | WO 2006/041397 A1 | 4/2006 |
| WO | WO 2006/129436 | 12/2006 |
| WO | WO 2007/117212 A2 | 10/2007 |

* cited by examiner

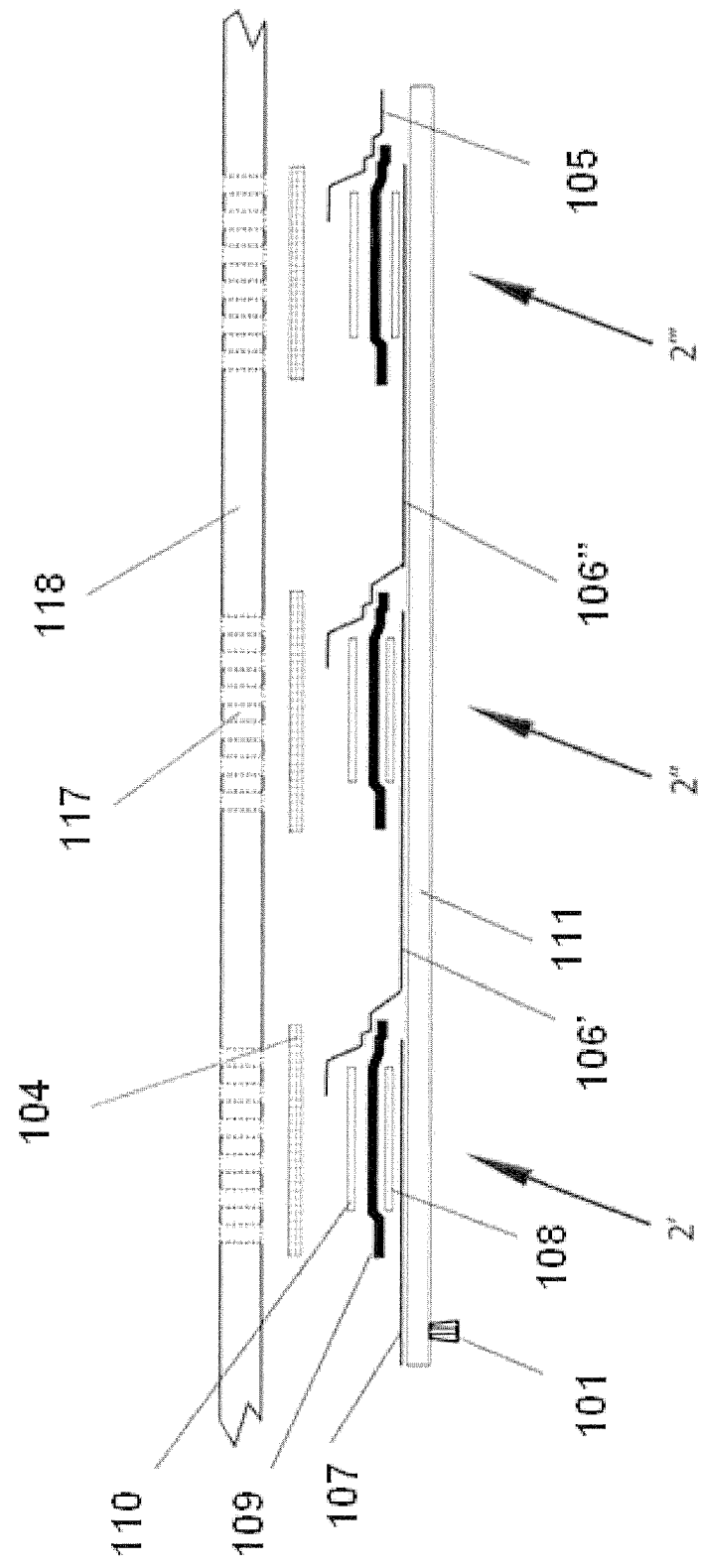

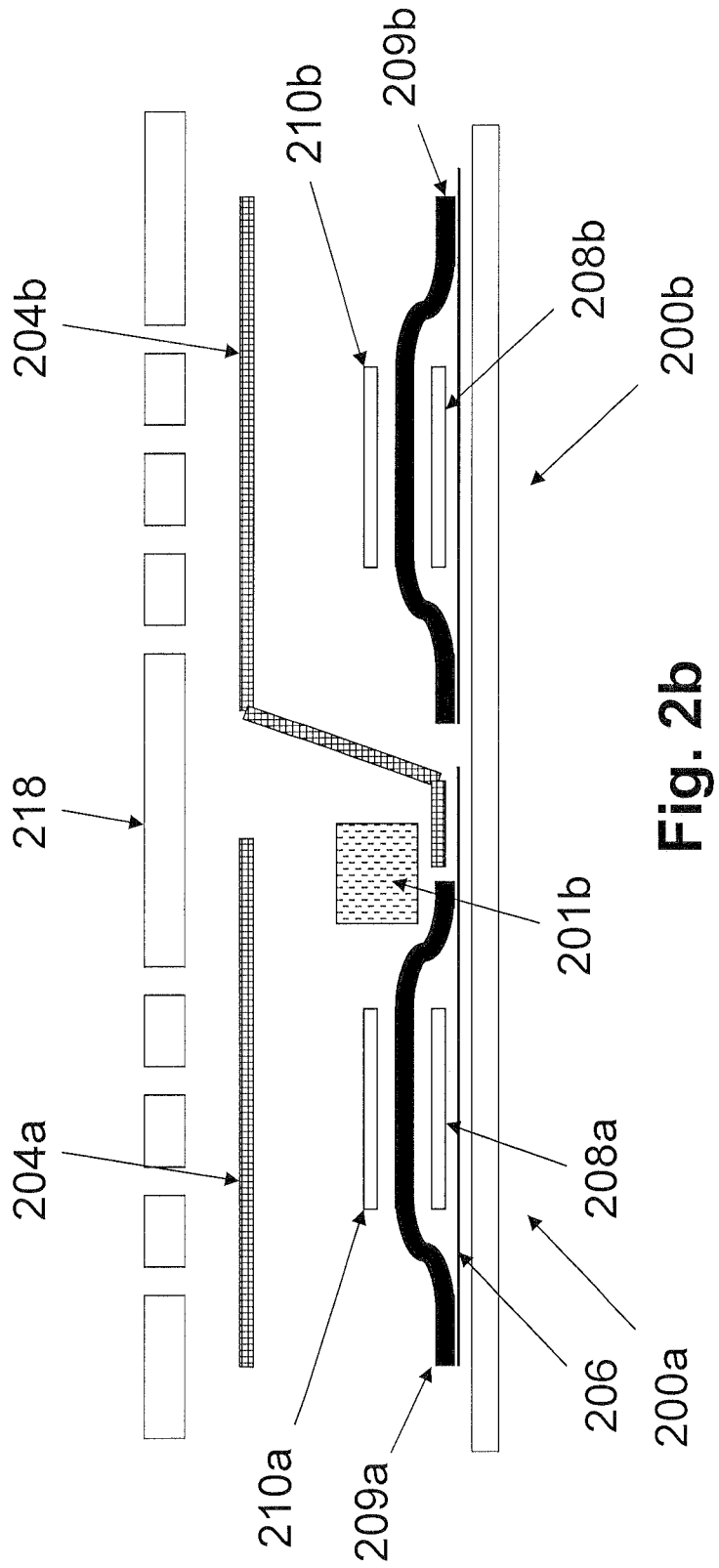

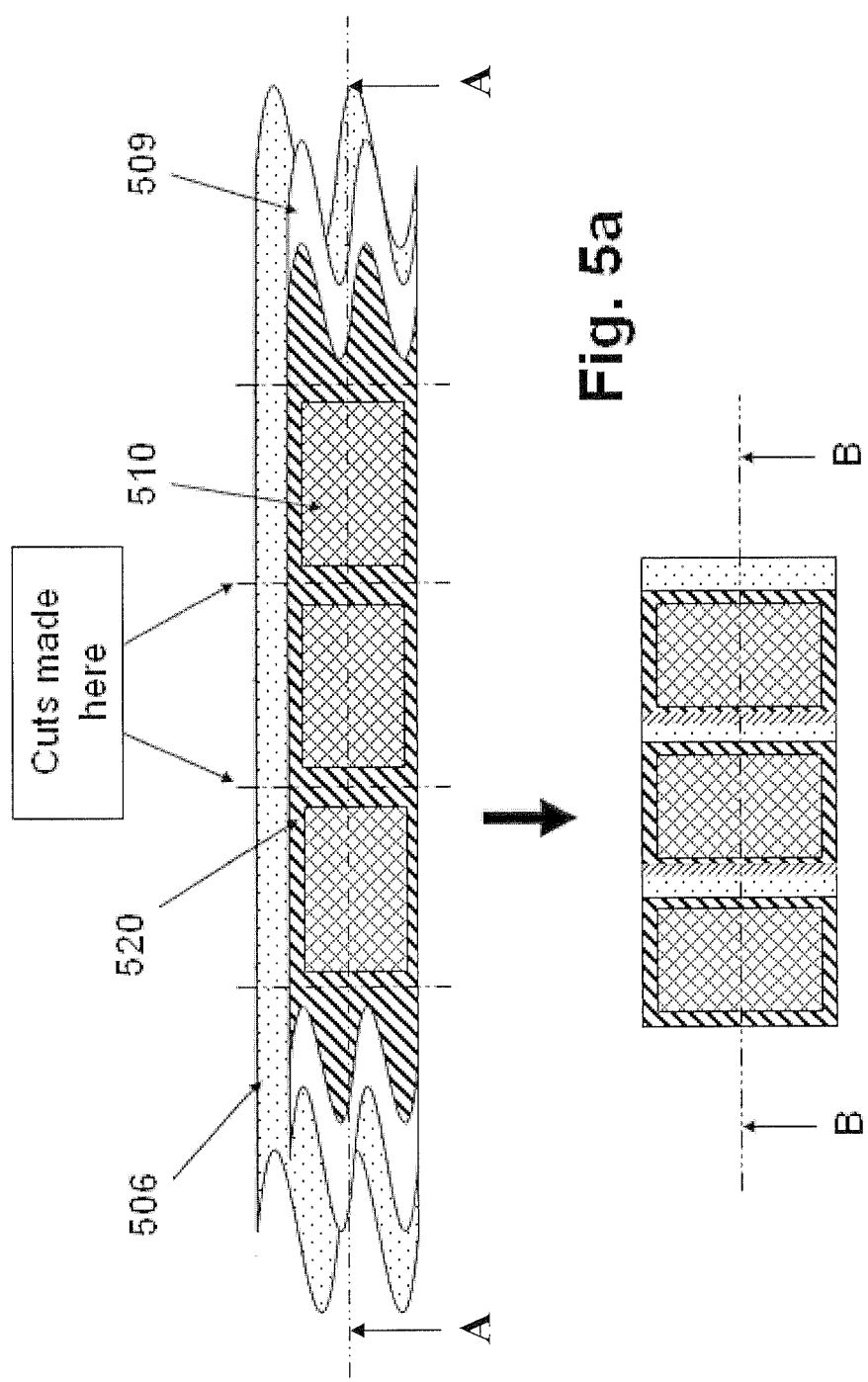

ARRANGEMENT FOR INTERCONNECTING ELECTROCHEMICAL CELLS, A FUEL CELL ASSEMBLY AND METHOD OF MANUFACTURING A FUEL CELL DEVICE

The present invention relates generally to electrochemical cells, and in particular fuel cells, wherein corrosion and/or poisoning in the MEA contact region is reduced, so as to improve service lifetime.

BACKGROUND OF THE INVENTION

The type of fuel cell that the present invention concerns is disclosed in International patent applications PCT SE2007/050222 and in PCT SE2005/001514.

Fuel cells of this type typically consist of the following design features/functionalities:

1) A sealing functionality creating the anode gas chamber. This is accomplished by using an adhesive which thereby seals the Membrane Electrode Assembly (MEA) to an anode current collector foil.

2) A gas distribution functionality to distribute the hydrogen gas to different cells in a fuel cell device. This is accomplished by forming a support plate with gas channels for the hydrogen gas. The fuel cells are attached to the support plate by adhesive and/or clamping means. From the support plate there are holes leading to the anode gas chamber of each cell.

3) An electrical interconnect functionality which collects the current from one cell and distributes it to the adjacent cell, preferably with minimal resistance and in such a manner that uniform current density is obtained over the active area of the cells.

4) A clamping feature. By subjecting the fuel cell to a clamping force the internal resistance within the cell is decreased, i.e. contact resistances between different materials and specific resistances inside materials (e.g. by compressing the Gas Diffusion Layer (GDL) its fiber-fiber connections improves). Analogous to the electrical contact also the heat conductivity is improved by the clamping and thereby more heat can be dissipated from the reaction layers (i.e. the electrodes). The clamping feature is closely linked to the electrical interconnect functionality.

All these design features/functionalities applied together form a fuel cell device.

In the prior art devices according to the patent application cited above, the interconnect functionality of a multiple cell fuel cell device is obtained by an electrically conductive current collector foil which is leading from the anode GDL of one cell to the cathode GDL of an adjacent cell. At the GDL of the adjacent cell there is an electrical interface (a contact area) to the clamping means (e.g. a gold plated metal net) which distributes the current over the cathode GDL. The GDL is thus working as a compressible element, pushing the foil against the net, when the cell is being clamped together.

One disadvantage with this design is that the current collector foil must partially cover the cathode GDL of the adjacent cell (i.e. beneath the interconnect area between the foil and the net), thereby hindering the air access to that part of the GDL and the MEA lying under it.

Another disadvantage of this design is that the current collector foil can come in electrochemical contact with the cathode of the MEA of the adjacent cell. This can happen when the water produced in the electrochemical cathode reaction ($2H^+ + 2e^- + \frac{1}{2}O_2 \rightarrow H_2O$) are forming an electrochemical electrolyte between the current collector foil and the cathode GDL and MEA. The electrochemical potential of the cathode causes ions (e.g. Cu-ions) to dissolve from the conductive foil and perhaps also from its adhesives. The ions are then transported into the MEA where they will poison both the catalysts and the proton conducting ionomer. The water produced in this way can also form a galvanic cell between the gold plated net and the conductive foil, thereby dissolving ions from the foil.

Life time experiments on prior art fuel cell devices designed according to FIG. 1 in the present application have shown that the performance is decreasing with more than 45% after 500 working hours. Post-test analysis on such cell membranes (with energy dispersive x-ray spectroscopy) has shown that the membrane contains Cu-ions which probably come from the conducting tape at the cathode side.

SUMMARY OF THE INVENTION

Thus, it is the object of the present invention to provide an improved arrangement for interconnecting electrochemical cells, in particular fuel cells, in series, whereby the problems of corrosion is eliminated or at least significantly reduced, and the effective service life time is extended. A second objective of the invention is to improve the heat conductivity between the components of the fuel cell so that heat is more easily dissipated and so that the fuel cell holds a more uniform temperature during operation. This will also improve the lifetime of the fuel cell.

These objects are achieved by the invention as defined in claim 1.

By separating the anode current collector from the cathode of the adjacent cell, while still providing electrical contact, corrosion and release of ions to the MEA is effectively hindered.

In a further aspect of the invention there is also provided a method of making a fuel cell assembly comprising an arrangement as defined in claim 1.

The invention also relates to a fuel cell assembly incorporating an arrangement as defined in claim 1.

The invention will now be described with reference to the appended drawing figures. The figures are only schematic illustrations and not drawn to scale. A reference in the description to "upper" or "lower" shall be interpreted as the orientation in the figure, bearing in mind the a fuel cell can have any orientation in use.

BRIEF DESCRIPTION OF THE DRAWINGS

FIG. 1 illustrates a prior art fuel cell device;
FIG. 2*b* illustrates a second embodiment of the invention;
FIG. 5*a* illustrates schematically the manufacture of cells according to the invention.

Figure 2A:
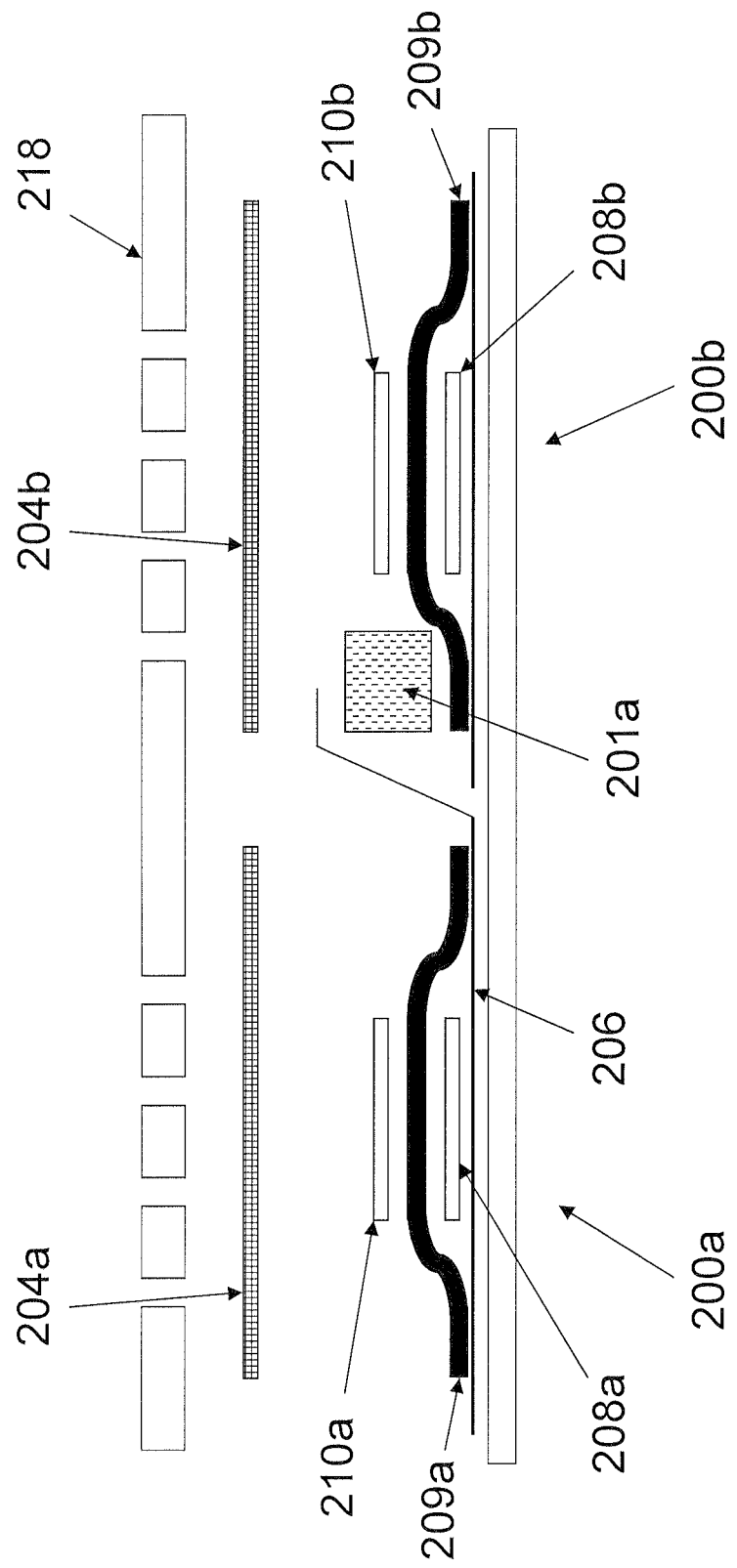
FIG. 2*a* illustrates a first embodiment of the invention.

DETAILED DESCRIPTION OF THE INVENTION OF THE INVENTION AND PREFERRED EMBODIMENTS THEREOF

FIG. 1 shows a fuel cell device according to the closest prior art. It comprises a plurality of fuel cells interconnected in series (three cells shown). The stack is provided on a support plate 111, on which all cells are mounted. Each cell comprises an anode GDL 108 and a cathode GDL 110, between which a MEA 109 is interposed. Electrical interconnection between cells is obtained by means of a current collector foil 106' which is connected to the anode GDL 108 of one cell and to the cathode GDL 110 of an adjacent cell, and thus functions as an anode current collector at one end, and as a cathode current collector at the other end. Thus, the foil is provided at the bottom of one cell assembly (in the middle in the figure) on the support plate 111, it extends out from that cell assembly and is further extended to rest partly on the MEA of the adjacent cell (to the left in the figure), and ends in contact with the cathode GDL 110 of the adjacent cell.

On top of each cell there is provided an inert, air pervious clamping member 104, which can be a gold plated metal net or perforated steel plate. Finally, a top plate 118 is provided over the entire array of cells to keep the components tightly together and to decrease inner resistances. In the top plate there are gas inlets 117. Under the support plate there is preferably a backing plate (not shown in FIG. 1).

As can be clearly seen in FIG. 1, the current collector foil 105, 106', 106" will be in contact, at least partially, with the MEA 109. During operation of the cell this contact can lead to electrochemical reactions occurring between the MEA and the foil. These reactions will in fact cause corrosion of the foil, whereby ions will be released, and the ions will subsequently poison the MEA, thereby causing a shortened effective life of the cell assembly. This is especially true for the cathode side with high electrochemical potentials where water is formed. For the anode side the conductive adhesive is working as a protective layer hindering the corrosion.

In order to eliminate the harmful corrosion/poisoning, the invention provides an improvement in the design, namely that provisions are made for preventing the current collector foil from one cell from coming in contact with the cathode side of the MEA and the cathode GDL of an adjacent cell to which it is connected.

Thus, in the most general aspect of the invention, the electrical contact to the adjacent cell is instead accomplished by connecting the current collector foil that extends from the anode side of one cell to a conductive part of the clamping means of an adjacent cell, without making any direct physical contact with the MEA or the cathode GDL of that cell. The conductive part of the clamping means is in contact with the cathode GDL, thereby mediating the electrical contact from the foil, thereby avoiding corrosion and accompanying poisoning of the MEA.

The expression "clamping means" includes one or several components which compress the fuel cell and uniformly distributes the current to the fuel cell. The clamping means can have an air pervious component (clamping member) which is inert and exhibits a high electrical conductivity, e.g. a gold plated stainless steel net or a gold plated plate/foil having apertures for gas permeation. In other embodiments, the clamping means can comprise only a suitably patterned clamping plate.

By this arrangement of the current collector foil, the electrical current is transferred to the cathode of the adjacent cell. The advantage of this design is that the conductive foil component (including conducting adhesive) only needs to be electrochemically inert under anode conditions. This is because only the clamping means are in contact with the cathode side of the MEA and the cathode GDL of an adjacent cell.

The term "conductive foil" shall be taken to encompass a copper tape with electrically conductive adhesive, or a tin (Sn) coated copper foil with or without an electrically conductive adhesive. It may also be a thin carbon based material such as, but not limited to, a graphite foil made from thermally expanded graphite, a carbon fibre cloth, a carbon paper material, a combination of the above listed materials. It could also be any other electrically conductive foil material, as long as its structural performance meets the requirements set by the environment in the cell.

Generally the invention provides an arrangement for interconnecting electrochemical cells of the type having a membrane electrode assembly (MEA) interposed between an anode gas diffusion layer and a cathode gas diffusion layer, and first and second current collectors coupled to said anode and cathode gas diffusion layers (GDL), respectively, wherein the first current collector can be a conductive foil, extending from the anode side of one cell to the cathode side of an adjacent cell, and wherein the cell components are clamped together.

The first current collector which is in contact with the anode gas diffusion layer a first electrochemical cell is configured to be connected to the cathode side of a second, adjacent electrochemical cell via an inert conductive clamping member, without being in electrochemical contact with the electrochemically active components of the adjacent cell.

Suitably, a spacer member in the form of an insulating element is interposed between the anode current collector of the first cell and the cathode side of the second, adjacent cell, wherein electrical connection is provided by said inert conductive member.

A first embodiment of the new design is illustrated in FIG. 2a.

Two cells 200a and 200b, respectively, connected in series are shown. Each comprises an anode GDL 208a and 208b, a cathode GDL 210a and 210b, a MEA 209a and 209b, and an inert conductive clamping element 204a and 204b, respectively.

A conductive foil 206 is provided beneath the anode part of the first cell 200a (to the left) and extends out to the right for connection to the second, adjacent cell 200b.

In this embodiment, an insulating spacer member 201 is interposed between the anode conductive foil 206 (extending from under the anode side of one cell 200a, to the left in the figure) and the MEA 209b of the adjacent cell, so that the electrical connection to the clamping means component 204b (e.g. a gold plated net or a steel plate) of an adjacent cell 200b is ensured, while at the same time ensuring that the foil 206 is electrochemically insulated from the MEA 209b of the adjacent cell 200b, when the assembly is pressed to the top clamping plate (e.g. by clamping/screwing together the top clamping plate and a backing plate, not shown in the figure). Thus, the first current collector 206 has an extended portion which is in contact with the upper surface of said spacer member 201 when clamped by said inert conductive member 204b against the spacer member 201.

The positioning of this electrical connection should preferably be selected such that condensed water cannot form an electrochemical cell between the current collector foil and the MEA. Such an electrochemical cell could serve as a passage for ions being released in a corrosion process.

However, if other measures are taken so that the formation of an electrochemical cell between the anode foil 206 and the cathode of an adjacent cell can be avoided, then the positioning of the electrical connection will be less critical. E.g. by hydrophobising the surface of the spacer member material or introducing some other barrier for liquid film formation the water will not so easily diffuse to undesired spots in the cell environment.

In another embodiment, illustrated in FIG. 2b, the clamping means component 204b (e.g. gold plated net) of one of the cells (the one to the right in the figure) is bent downwards at an angle such that it extends away from the cell assembly and does not come into contact with the MEA of the same cell, to contact the current collector foil 206 of the adjacent cell (the one to the left in the figure). An insulating spacer member 201 is placed on the clamping means component (i.e. the net) and is pressed down by the top plate 218, thereby electrically connecting the net 204b to the current collector foil 206.

Thus, in this embodiment the bottom surface of the spacer member is in contact with a portion of the membrane electrode assembly (MEA) of said first cell 200a, and the inert conductive member 204b is clamped between the bottom surface of said spacer member 201 and the current collector 206. Said spacer member is preferably attached by adhesive means during fabrication/assembly of the cells.

Here the inert conductive member 204b extends from the bottom of the spacer member 201 upwards and into contact with the cathode GDL 210b of the adjacent cell 200b.

The clamping means component 204 (e.g. gold plated net) can also have a mechanical integrity so that when being shaped in accordance with FIG. 2b, the spring force of the clamping means component ensures the electrical contact. Said spacer member 201 is preferably a compressible cushion, and should preferably be made of a porous plastic material which is inert in the fuel cell environment. Preferably, the material or the surface of the material should also be hydrophobic so that liquid film formation of condensed water can be avoided. Examples of suitable materials for the spacer member are porous tetrafluoroetene (PTFE) or similar hydrophobic materials, porous silicon rubber or another compressible and inert plastic material. If the material is not hydrophobic in itself, it should preferably be coated with a hydrophobic material such as PTFE. The properties listed above for the spacer member shown in FIG. 2b, also applies for other embodiments of spacers such as the frame structures described below and illustrated in other figures herein.

The spacer member 201 can also be non-compressible but this sets higher demands on dimensioning the cushion correctly and/or that more compressible GDL materials are selected for the components 208 and 210. In such case it could be made from nonporous PTFE or silicon.

Figure 3:
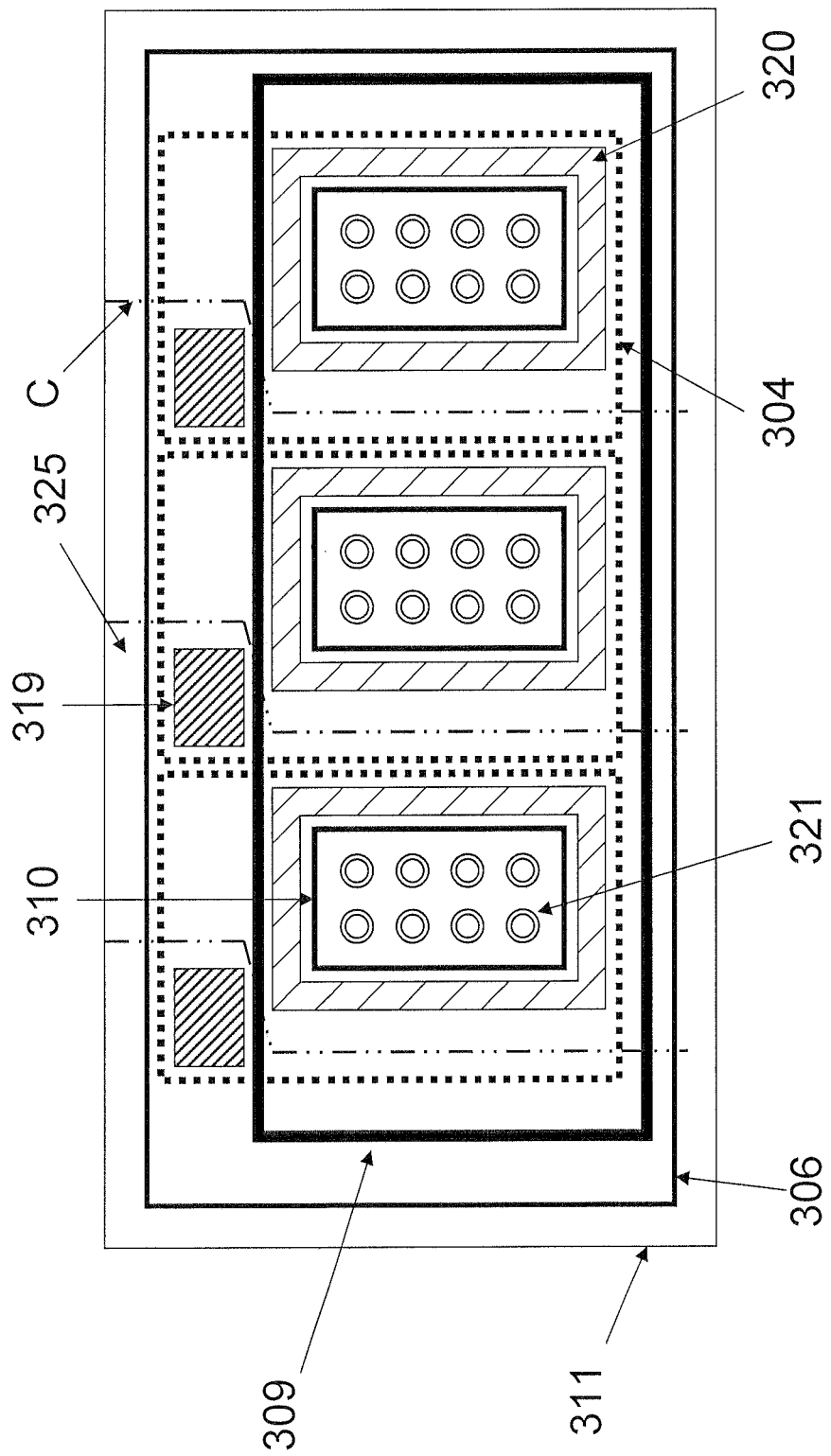
FIG. 3 illustrates a third embodiment of the invention.

FIG. 3 is a schematic top view illustration of how a multiple fuel cell can be designed according to a further embodiment of the present invention, using the basic principle from FIGS. 2a and 2b.

A support plate 311 is provided at the bottom and can be made from a plastic, electrically insulating material and include a hydrogen supply system. In FIG. 3 the component 311 can also be a plastic foil which, when in use, is attached to other components thus forming the support plate. This design of a support plate can be applied by the skilled man for other embodiments as well, without any further inventive work. On the support plate a conductive foil, e.g. a copper tape or a graphite sheet/foil/member, is attached by adhesive means. An anode GDL is attached on the foil, and one or several holes 321 are cut through the support plate 311 and the conductive foil 306. Through the holes 321 in the support plate 311 and the foil 306, hydrogen is fed into the anode fuel chamber, which is approximately defined by the area 310 of the anode GDL and its thickness.

A MEA 309 is attached over the anode GDL and extends over a part of the support plate and the foil. On top of the MEA 309 and essentially aligned with the anode GDL there is provided a cathode GDL.

Up until this stage the three (in this example) cells are built in one piece (i.e the MEA, the conductive foil, and an intermediate support plate). The intermediate support plate is used for mounting purposes only. The cells are separated into discrete components by cutting along the broken lines C indicated in the figure and positioned on the support plate 311 with a small distance between them in order to avoid short circuiting between the cells.

As can be seen the foil will then be shaped such that there will be formed a "flap" 325 that extends away (to the right in the figure) from the cell assembly. This "flap" is used for creating the contact to the adjacent cell via a spacer member 319, as described below.

Finally, an inert conductive clamping means component 304 (e.g. a gold plated gas pervious metal net) is applied to cover the entire assembly of MEA and GDL's and to extend slightly out over the periphery of the MEA component. At the periphery of the support plate along its long side (upper side in FIG. 3) there is provided a spacer member 319. The foil 306 is bent upwards and its "flap" 325 is placed on top of the spacer member 319, in the same manner as shown in FIG. 2a. The clamping means component in the form of the gold net 304 will cover the foil resting on top of the spacer member 319 in order to obtain electrical contact.

Thus, the spacer member 319 is located adjacent to the cell arrangement to one side thereof, and wherein the current collector 306 from each cell extends perpendicularly relative to the longitudinal direction of the cell arrangement and forms a flap 325. The flap 325 is configured to be off-set relative to the extension of the cell, such that a portion of the flap is located adjacent an adjacent cell, and wherein said flap extends from the anode side of the cell it belongs to and upwards to be located on the top surface of said spacer member 319, where it is clamped by the inert conductive member 304.

Optionally, the GDL/MEA/GDL unit/stack can be enclosed by the provision of a frame structure 320, which can be made of the same material as the spacer member 319. The purpose of this frame is i) to ensure that the MEA is pushed down to the adhesive of the anode portion of the conductive foil 306 thereby improving the gas tightening properties of the adhesive seal, ii) to decrease the need for a large sealing area, iii) to provide a better mechanical support for the clamping means component (e.g. gold plated net) so that it bends less upwards over the active area, and iv) to improve the transfer of heat between the support plate and the clamping means. This particular design aspect of the frame structure can be applied for any other embodiment by the skilled man without inventive effort. Thus, a frame as disclosed above, can be implemented in all embodiments shown herein.

This design solves the problem that can occur when using an adhesive to seal the anode chamber (as in the prior art), namely that when an overpressure is applied to the hydrogen gas the adhesive performance might not be enough and the MEA might be lifted from the anode conductive foil. Thereby, a leakage of gas may occur. This problem is accentuated at higher temperatures when the adhesive plastic becomes softer and its sticking force decreases. The purpose of the spacer frame is thus to prevent this leakage and to enable the use of this type of fuel cells at higher anode chamber pressures, which may prevail in certain systems, an example of such a fuel cell system design is a so called "dead-end" system.

One advantage with the design of FIG. 3 is that the fuel cell can be produced by rotative dye cutting in a continuous manner from materials sitting on rolls.

Figure 4A:
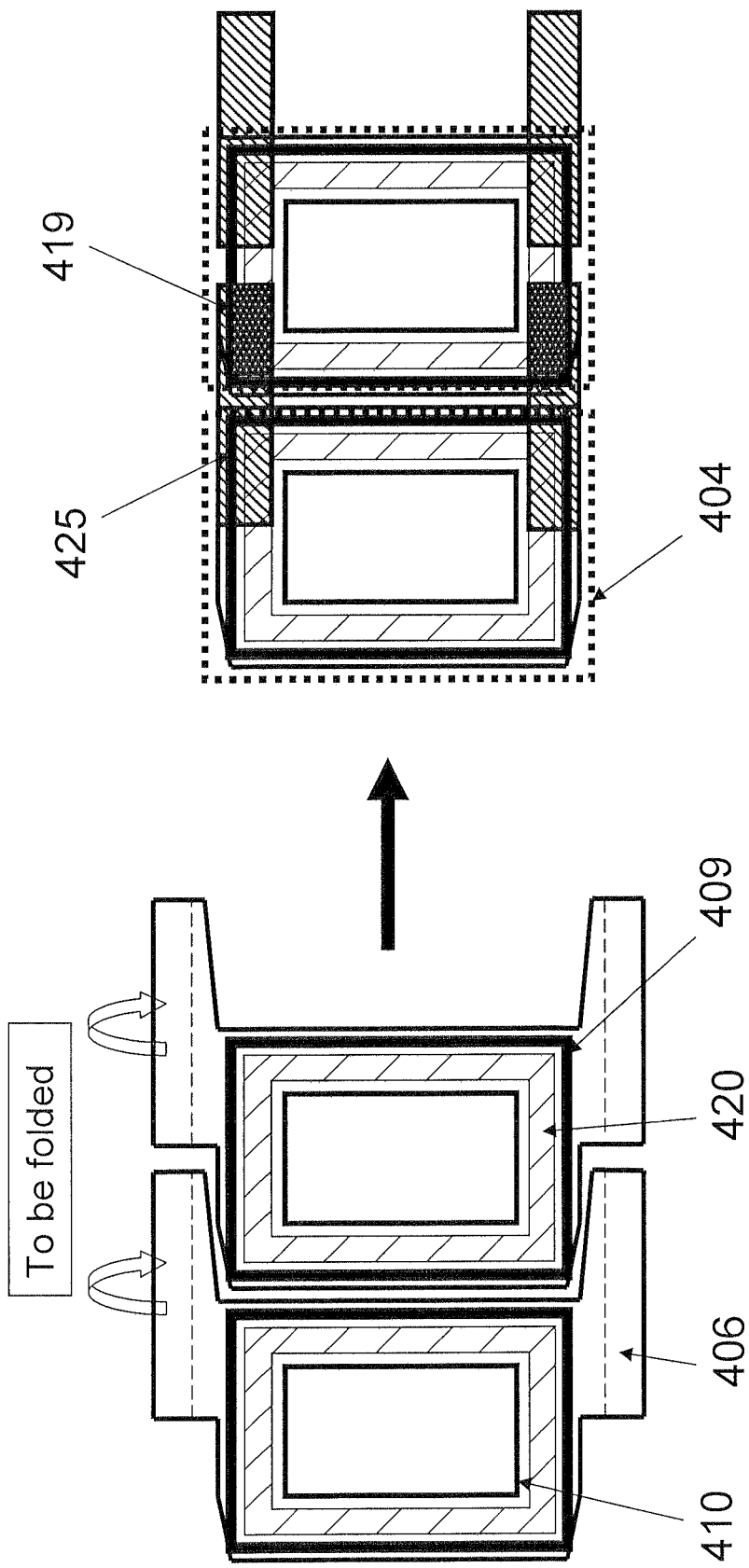
FIG. 4*a* illustrates a fourth embodiment of the invention.
Figure 4B:
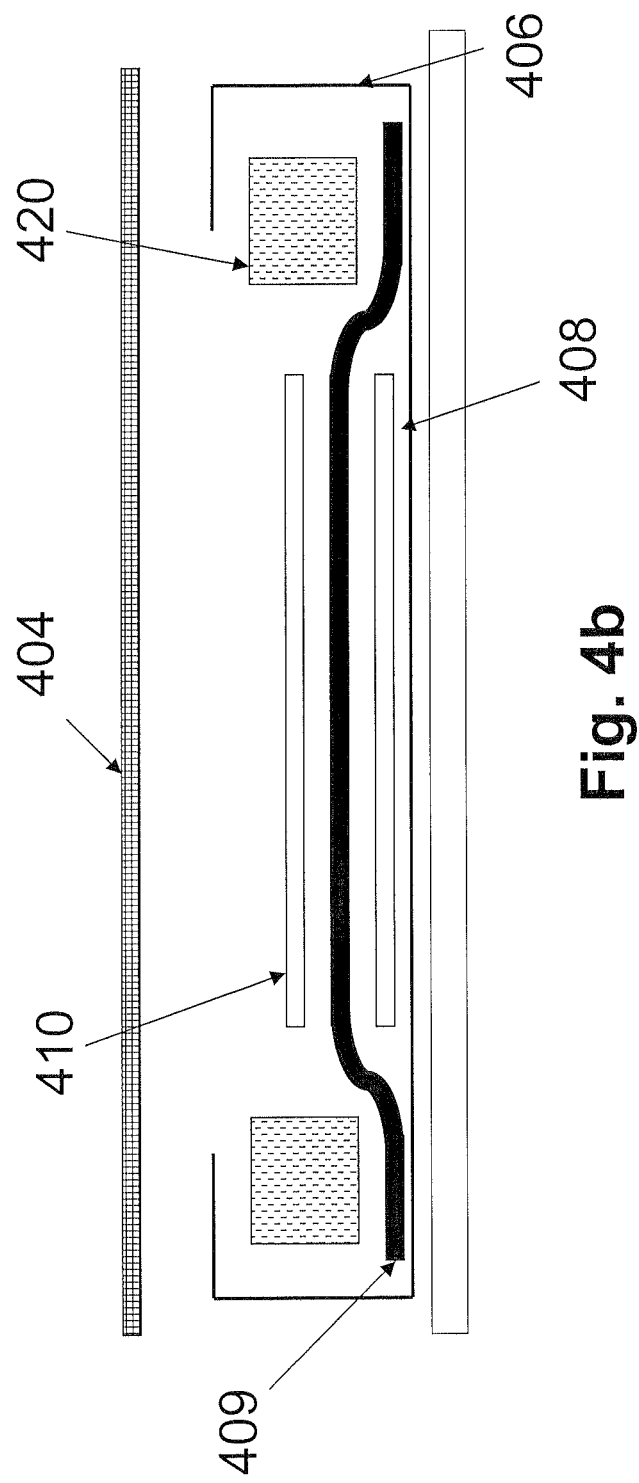
FIG. 4*b* is a schematic cross section of FIG. 4*a* illustrating the folding (certain elements not shown)

In one preferred embodiment the spacer frame and the spacer member for electrical contact can be integrated into one. This is schematically illustrated in FIGS. 4*a-b*, where the current collector foil 406 from the anode side 408 of one cell is wrapped around the spacer frame 420 thereby providing contact to the cathode side 410 adjacent cell. This folded portion of the foil 406 must be electrically insulated from the part of the first cell, i.e. the cell to which the foil belongs, in order not to short-circuit the cell. There is provided a contact area 419 on the adjacent cell where the conductive clamping means 404 (e.g. gold plated net) provides the electrical contact. The insulation at 425 can be provided as a layer of insulating material on the foil, or as a thin member of insulating material interposed between the components. Any other way of insulating is of course possible as long as the cell is not short-circuited.

Figure 5B:
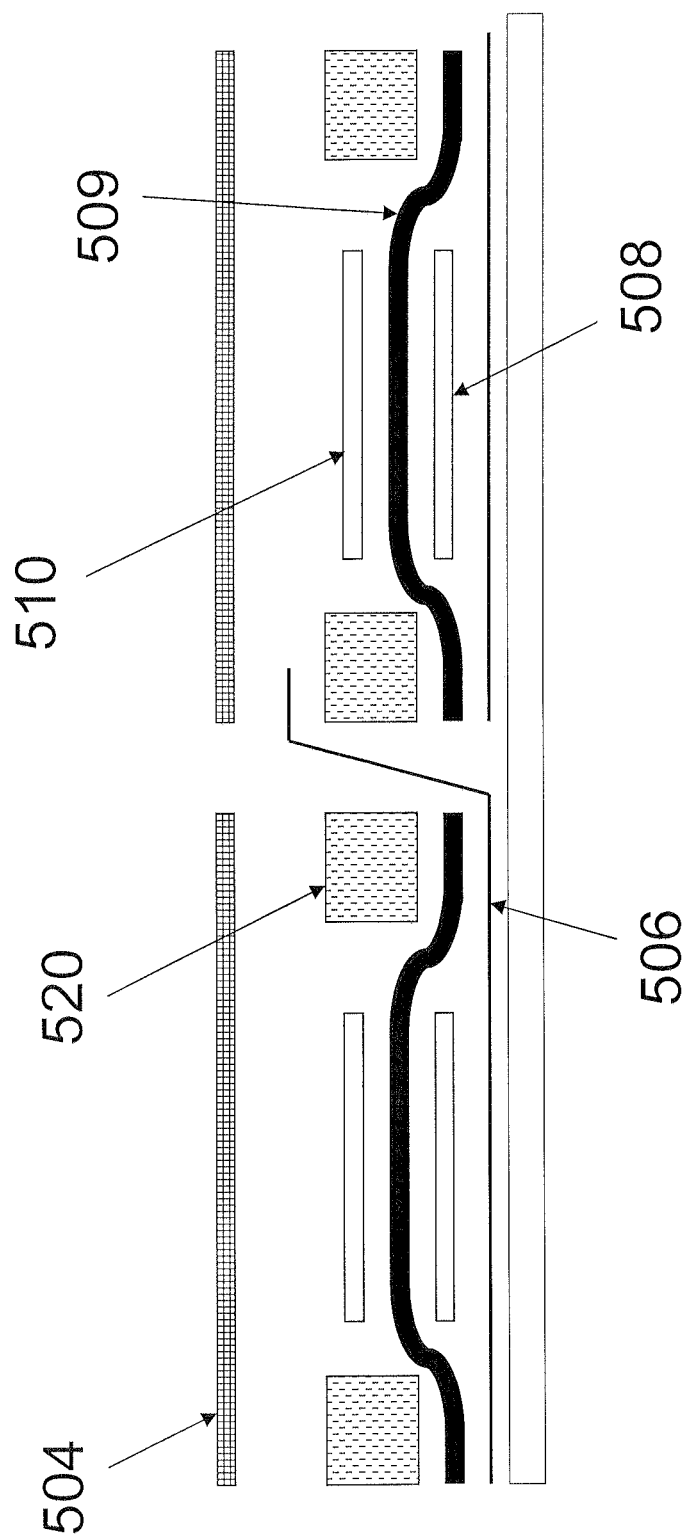
FIG. 5*b* is a cross section view at B-B through assembled cells obtained from the process in FIG. 5*a* (with clamping means added)
Figure 6:
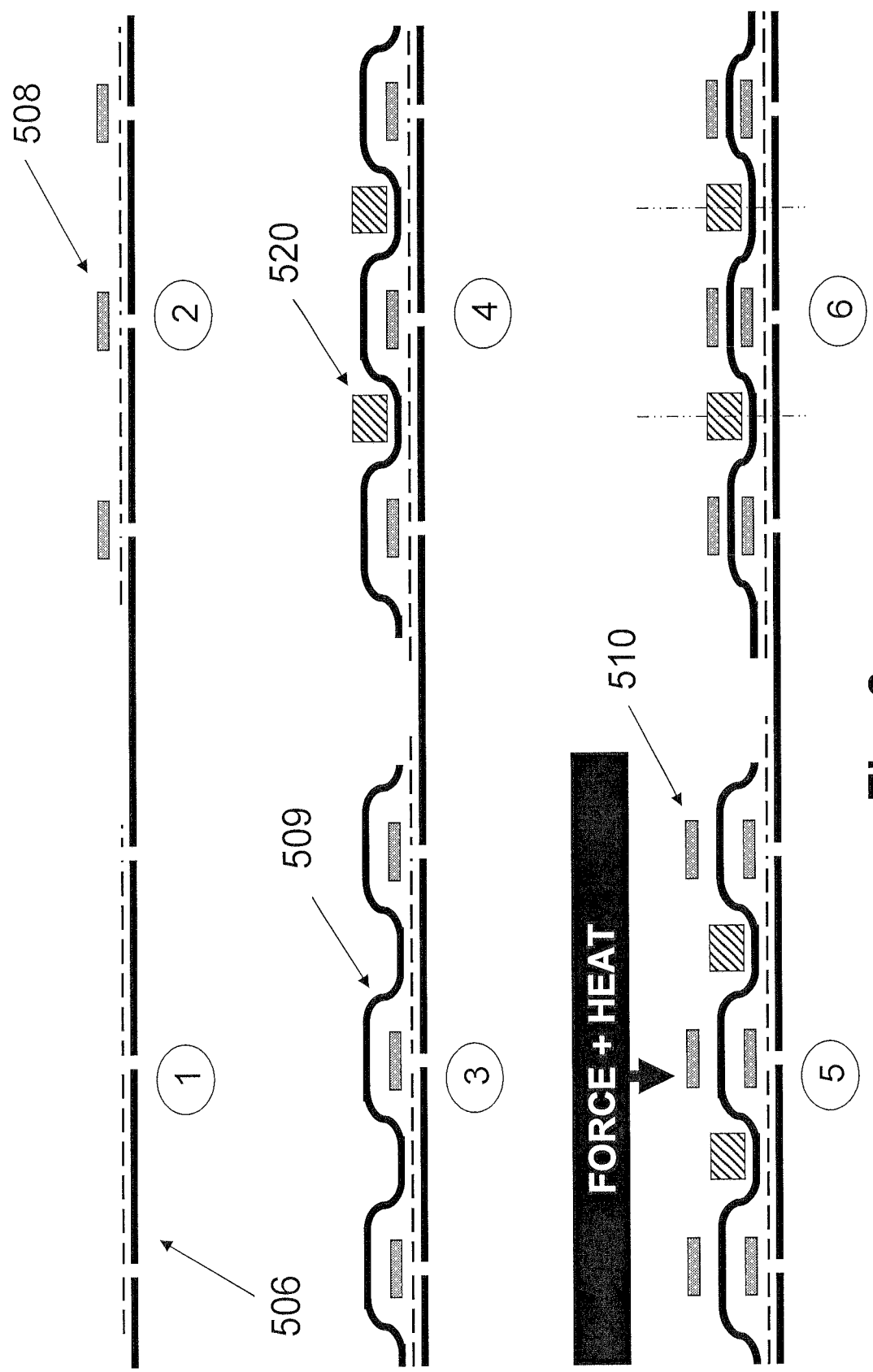
FIG. 6 illustrates a schematic production scheme of the invention.

Another preferred embodiment is schematically illustrated in FIGS. 5*a-b*. In this embodiment the individual cells can be produced in a continuous manner, in e.g. a rotating punching robot, and according to a production scheme described below and in FIG. 6, comprising 6 steps (wherein Step 6 can be viewed as the cross-section between A and A in FIG. 5*a*).

Step 1: creating holes in the conductive foil for gas inlet/outlet to the anode. If a conductive adhesive is used, it should be placed upwards as indicated by the dotted line in FIG. 6. Optionally an intermediate support plate can be placed under the conductive tape (not indicated in FIG. 6).

Step 2: placing of the anode GDLs 508 on the conductive foil 506. The anode GDLs should be positioned over the holes so that it corresponds to the cathode GDL 510 which will be placed on top in a later step.

Step 3: the MEA 509 should be placed over the anode GDLs, attached and sealed by the adhesive of the conductive foil 506, and thereby forming the anode gas compartments of each cell.

Step 4: now the frame structure 520 is placed on top of the MEA. The frame structure should be positioned so that the hole of the frame is positioned over the anode GDL of each cell.

Step 5: now the cathode GDLs are placed in the holes of the frames and then, optionally, a hot pressing step is applied to better integrate the GDLs with the MEA.

Step 6: The individual cells components are now separated from each other by cutting at the dotted line. By twisting the cell components 90 degrees against the production direction and placing them on a support plate or a foil 511 as in FIG. 3.

Two connected cells with clamping means are shown in FIG. 5*b*.

In FIG. 5*b* there is schematically illustrated a further embodiment of the invention. A fuel cell assembly comprises a plurality (two shown) of fuel cells each comprising an anode GDL 508 and a cathode GDL 510 separated by a MEA 509, all elements provided on a support plate. A conductive foil 506 extends across the anode side of a cell and to one side thereof, and is further folded upwards and placed on top of the spacer frame 520 of the adjacent cell, and in contact with the clamping member 504. A spacer member is provided in the form of a frame 520 of e.g. Poron®, said frame being provided so as to clamp the MEA and the foil 506.

Figure 7:
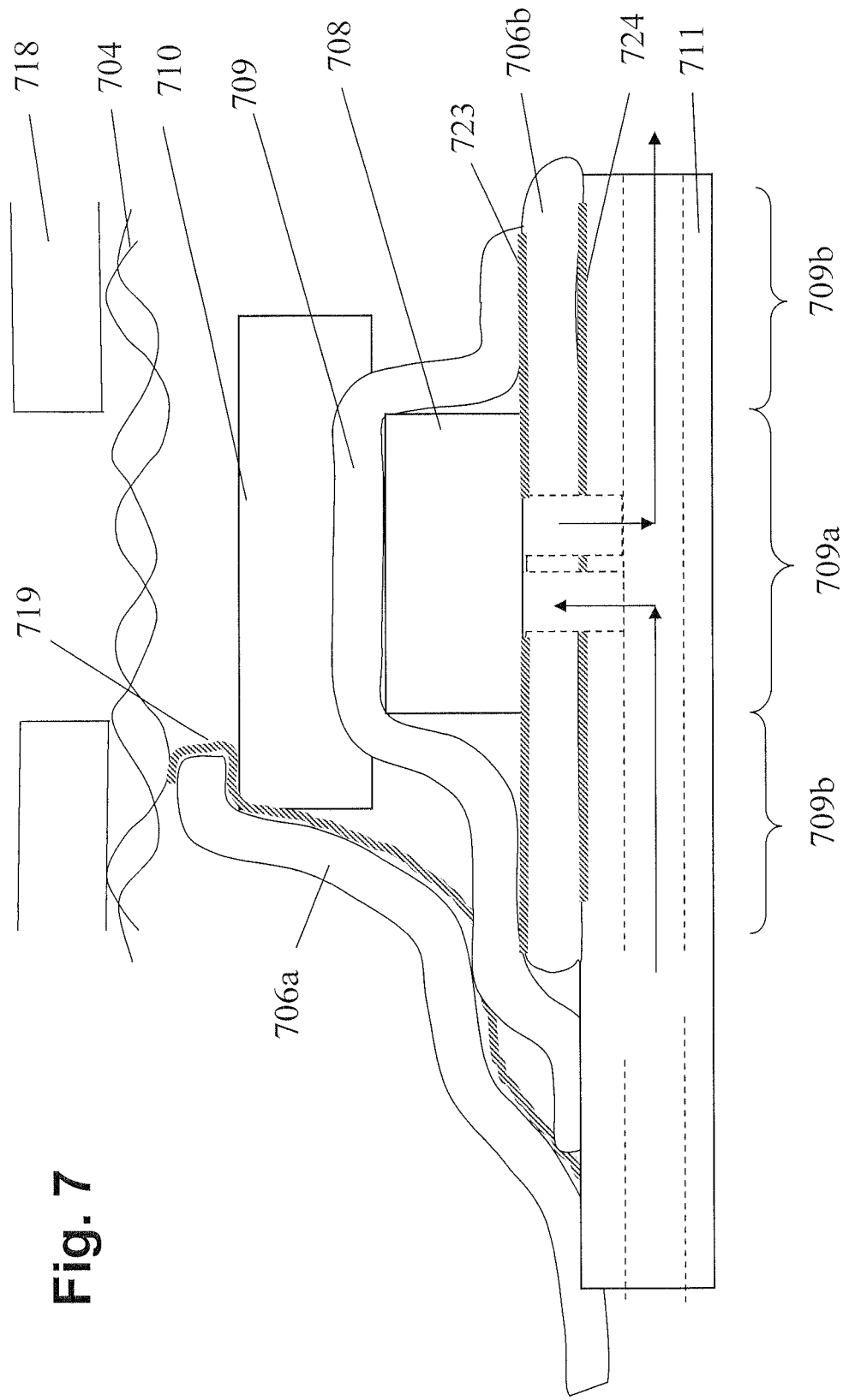
FIG. 7 shows a cell arrangement wherein the cathode GDL is larger than the anode GDL.

In FIG. 7 another embodiment is illustrated. Here the cathode GDL 710 is extended, so that the current collector foil of an adjacent cell 706*a* can be clamped between the cathode GDL 710 and the clamping net 704 (or perforated clamping plate) without covering the active area 709*a* of the cell. The anode GDL is designated 708. Please note that when being clamped, the clamping net 704 is in direct contact with both the current collector foil 706*a* and the cathode GDL 710. Thus, the cathode GDL is exposed to shear stresses at the edge and therefore it should preferably have some mechanical integrity. The current collector foil on the anode side is designated 706*b*, and is in contact with the anode GDL 708. The adhesive sealing the structure is designated 723 and 724, respectively. The sealing regions are designated 709*b*.

In this embodiment the current collector foil 706*a* is partially covered/coated with a layer 719, preventing the electrochemical contact between the foil 706*a* and the cathode GDL 710 or the MEA 709. Said layer should preferably cover part of the upper side (in the figure) of the foil 706*a* and be hydrophobic in order to avoid film formation of condensed water.

New Material

The present invention can be further improved by choosing the correct material for the conductive foil. In prior art cells of this type (subject for patent applications), a copper-foil coated with an adhesive, containing silver coated plastic spheres, was used.

Figure 8:
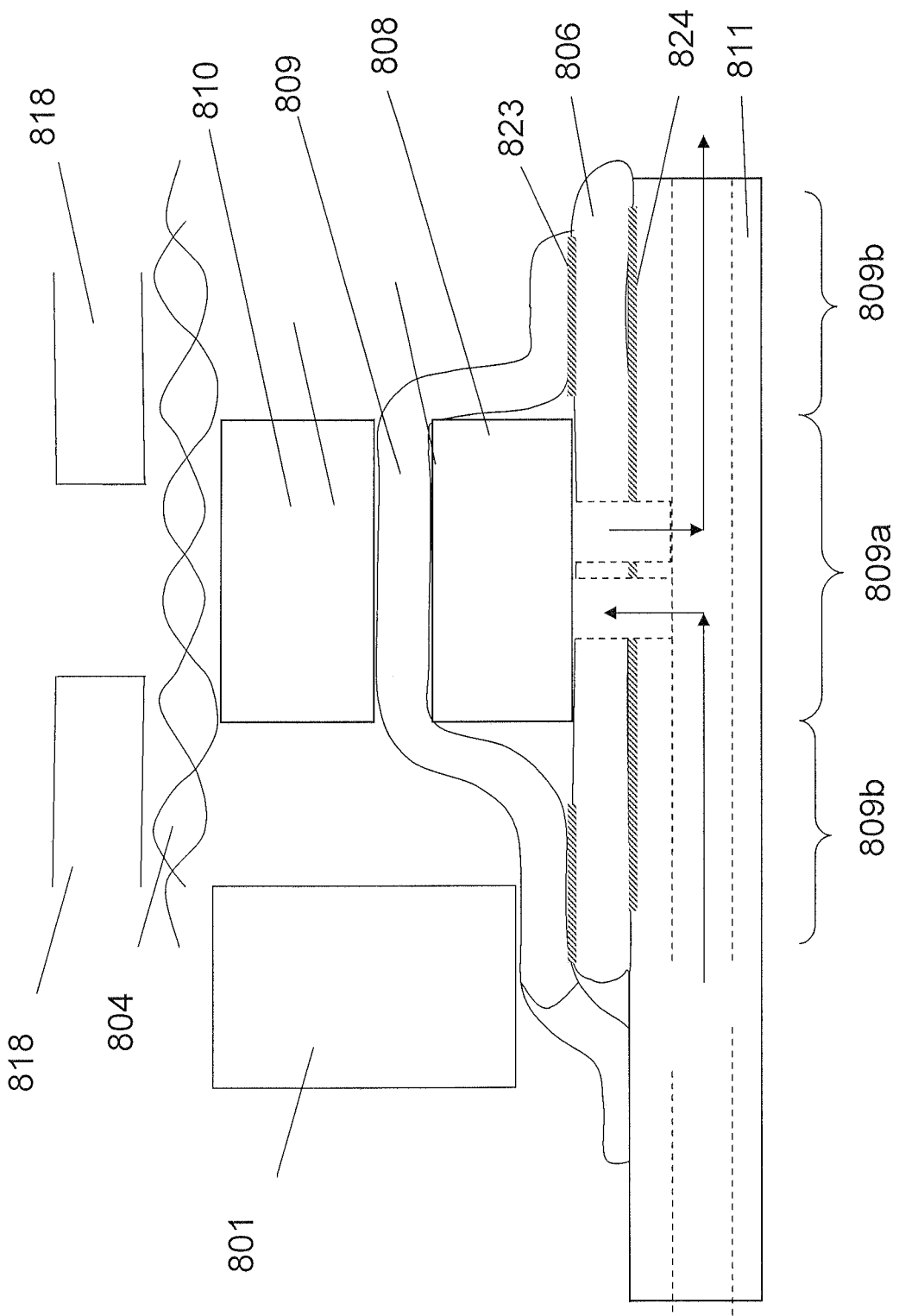
FIG. 8 shows an embodiment with a frame wherein the adhesive on top of the foil is not electrically conductive.

It has been found however, that when using a tin-coated copper foil as a current collector foil instead, one can use the tin-coated surface directly without the need for an electrically conducting adhesive. The cell may thus be designed as illustrated in FIG. 8. It comprises a support plate 811, GDL's 808 and 810, respectively, a MEA 809 interposed between the GDL's, a metal net 804, spacer members 801, a conductive foil 806 and a top clamping plate 818. It should be noted that the cell shown in FIG. 8 is drawn as a single cell, but this design can also be used in series connection, like the embodiments described in Examples 3 and 5.

The electrically conducting anode foil 806, has an adhesive 824 on the side facing the support plate 811. On the side facing up towards the MEA and the anode GDL, the area 809*a* is not covered with any adhesive, but the anode GDL is in direct contact with the tin-coated copper foil.

In the area surrounding the anode GDL area 809*a*, namely the area 809*b*, a double-sided tape or an adhesive 823 is placed to seal the anode gas compartment. It is important to note that in this design, the adhesive 823 does not need to be electrically conducting and therefore the risk for the contamination of silver from the silver-containing adhesive can be eliminated.

Figure 9:
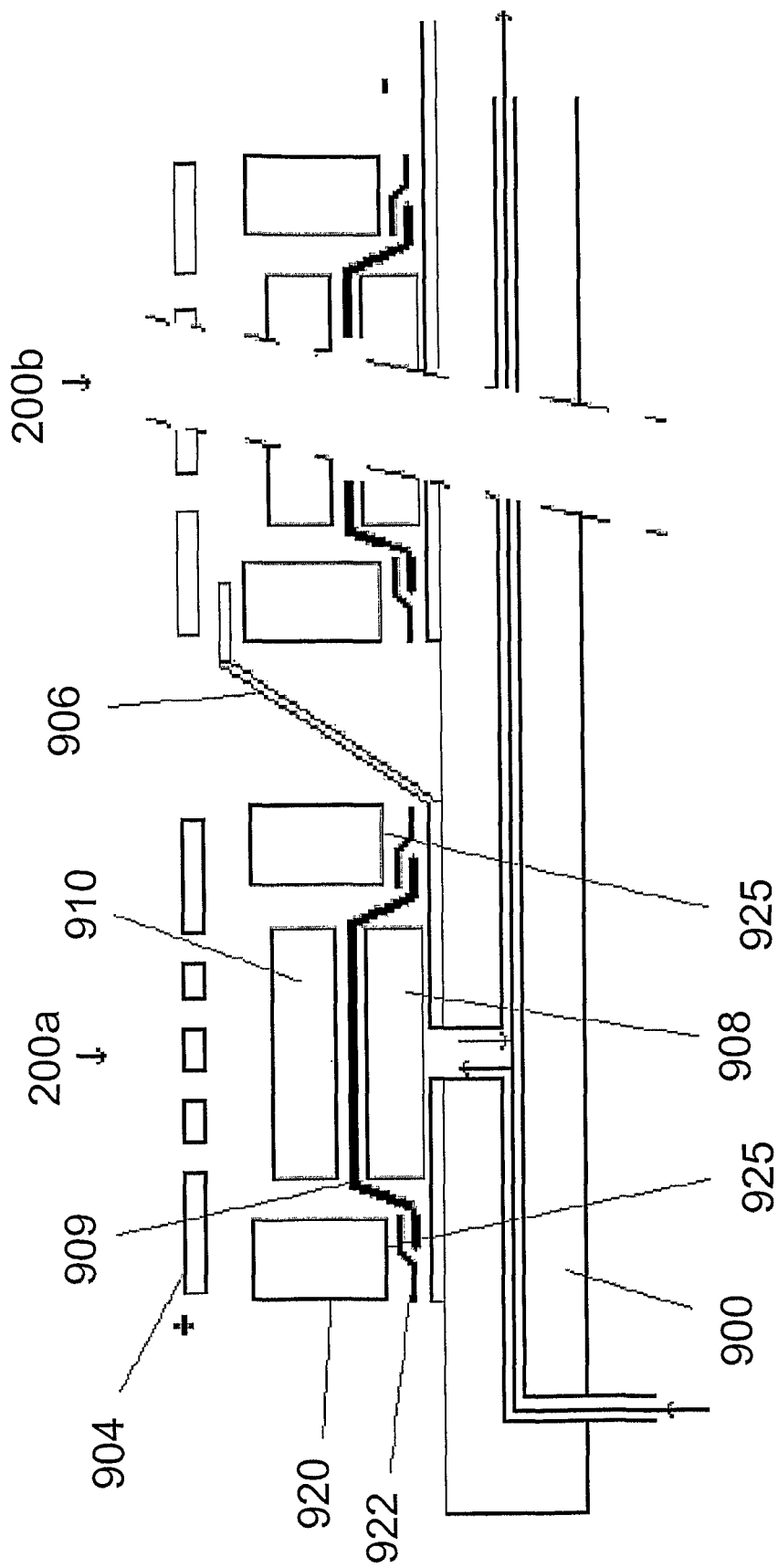
FIG. 9 shows an embodiment wherein the MEA extends in under the frame only to a fraction of the width of the frame.

In FIG. 9 there is schematically shown in cross-section two fuel cells 200*a*, 200*b* in series in which the inventive ideas have been implemented. The figure is not to scale, in particular in the vertical direction.

Thus, the thickness of the cell is in reality much smaller relative its surface extension than the figure indicates. Also the relative thicknesses of the components are not to scale.

In this particular embodiment the assembly comprises essentially the same components as the cell assembly of FIG. 5*b*. i.e. there is a support plate 900 (not explicitly indicated in FIG. 5*b*), on which a conductive foil 906 is attached by adhesive means. On the foil 906 there is an anode GDL 908 on top of which there is a cathode GDL 910, and interposed between these GDLs there is a MEA 909. There is also a frame structure 920, preferably made of a plastic foam material, such as PORON® (trademark belonging to Rogers Corporation). Other materials are of course possible, as mentioned above in connection with spacer member 201 in FIG. 2. On top of the assembly there is a top plate (clamping plate) 904, that will keep the assembly together by suitable means, not specifically described here. The clamping plate also functions as cathode current collector in this embodiment.

The particular feature of this embodiment is that the MEA 909 extends in under the frame only to a fraction of the width of the frame. If the frame is say about 2 mm, the MEA edge will extend in under the frame about 1 mm. It is possible that only as little as 0.5 mm of the MEA edge can be used, and still maintain a proper clamping and leak tight condition. In this way as much as up to 20% of the MEA material can be saved, when the active area is a few $cm^2$, which will reduce production cost significantly, in that the MEA is by far the most expensive component of the fuel cell.

In order to further improve the device, there can be provided a suitable adhesive 922, or glue, on the bottom side of the frame 920, i.e. that surface of the frame 920 contacting the MEA 909. Suitable adhesives for use in the fuel cell device of the present invention should be: 1) non-soluble with water, 2) non-reacting and resistant to dissolution in the electrochemical environment of the running fuel cell, 3) the chemical components being dissolved should not poison the fuel cell, 4) heat resistant up to 80° C. Examples of such products are adhesives of VHB-type from the 3M-group.

The height or thickness of the MEA is only 20-50 μm, so the compressible frame material and the adhesive/glue can easily accommodate to form a tight seal when the cell is clamped.

Figure 11:
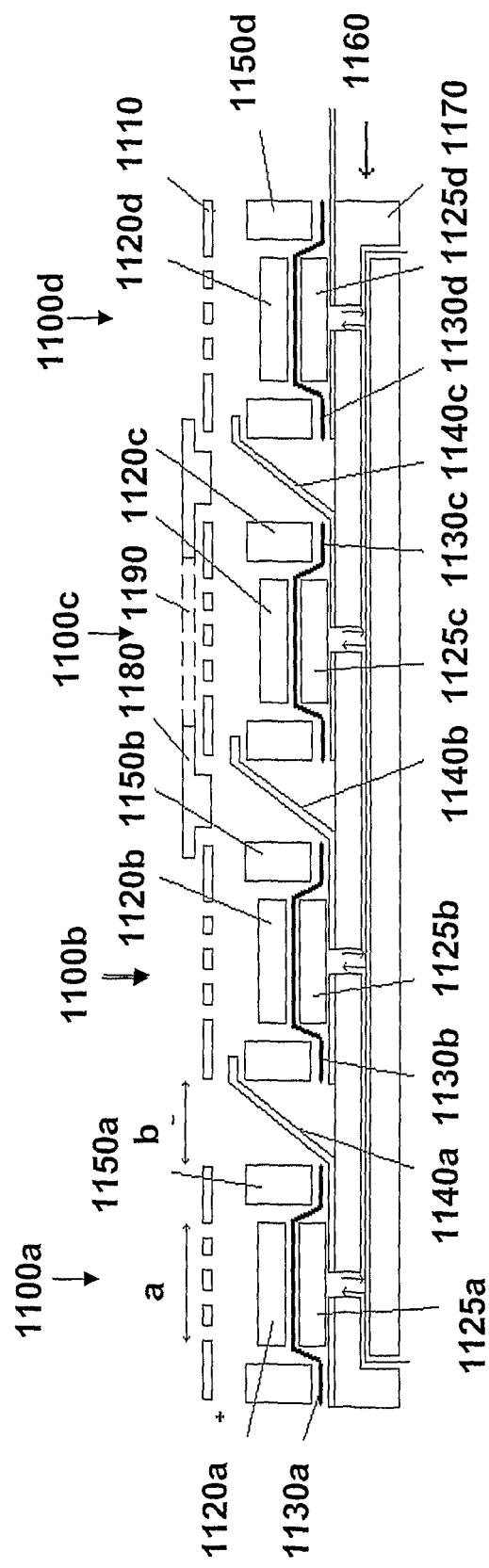
FIG. 11 illustrates a four cell unit.

The design of a preferred embodiment of a 4 cell unit is illustrated schematically in FIG. 11.

Figure 10:
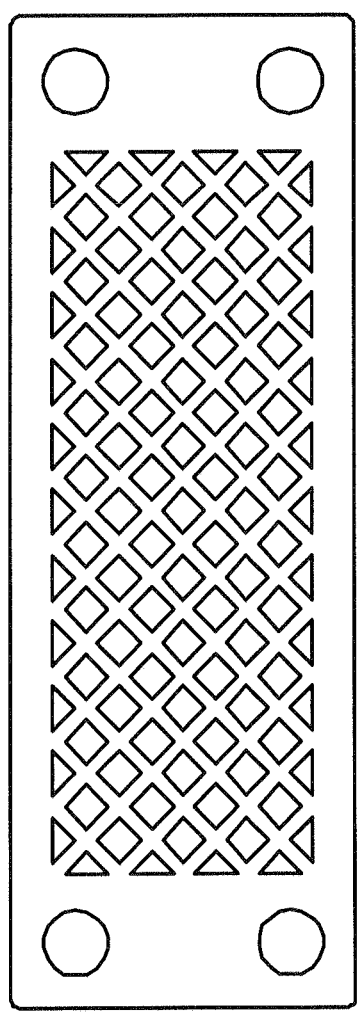
FIG. 10 illustrates a clamping means usable in the invention.

Here, the fuel cell of the present invention is a multiple cell unit of 3-8 cells. Said unit has gold coated stainless steel clamping plates 1110 that are 0.2-1.0 mm, preferably 0.3-0.8 mm in thickness and perforated for appropriate gas access to the cathode GDLs 1120a-d, and is used as cathode current collector. Anode GDLs are designated 1125a-d. The clamping means 1110 of the this fuel cell is suitably a 16 mm by 45 mm, steel plate with holes cut out (punched out) resulting in a shape as shown in FIG. 10.

The Membrane Electrode Assemblies 1130a-d can suitably be Primea 5710 from Gore. Gas diffusion layers (GDLs) are provided on both electrodes, with their micro porous side turned towards the MEA.

The anode current collector 1140 is made of a tin coated copper foil having an electron-conductive adhesive film on the side facing the MEA and the GDL. The adhesive can be based on a acrylic substance filled with silver coated polymer spheres. The foil is attached to the support plate by means of an adhesive on the opposite side.

Optionally, a tin-coated copper foil can be used where, on the side facing the anode GDL and MEA, a non-conductive adhesive is placed in the sealing area between the MEA 1130a-d and the foil 1140a-d. Said sealing area thus has the shape of a frame surrounding the GDL area (e.g. if the GDL has dimensions of 12×32 mm, and the MEA has diemensions 16×36 mm, then these ar the inner and outer dimensions of the frame, respectively). Between the MEA and the clamping plate 1100, surrounding the cathode GDL 1120, a 2 mm wide foam frame 1150 (suitable outer measures 16 by 36 mm, inner measures 12 mm by 32 mm, e.g made of Poron® 4790-92-25041-04) is fastened using an adhesive (same measures as the foam frame, 3M F9469PC) between the MEA and foam frame. The interconnects between the cells is made by extending and folding 1 mm of the anode current collector foil 1140 and placing it between the clamping plate 1110 and the foam frames 1150b-d.

Figure 12:
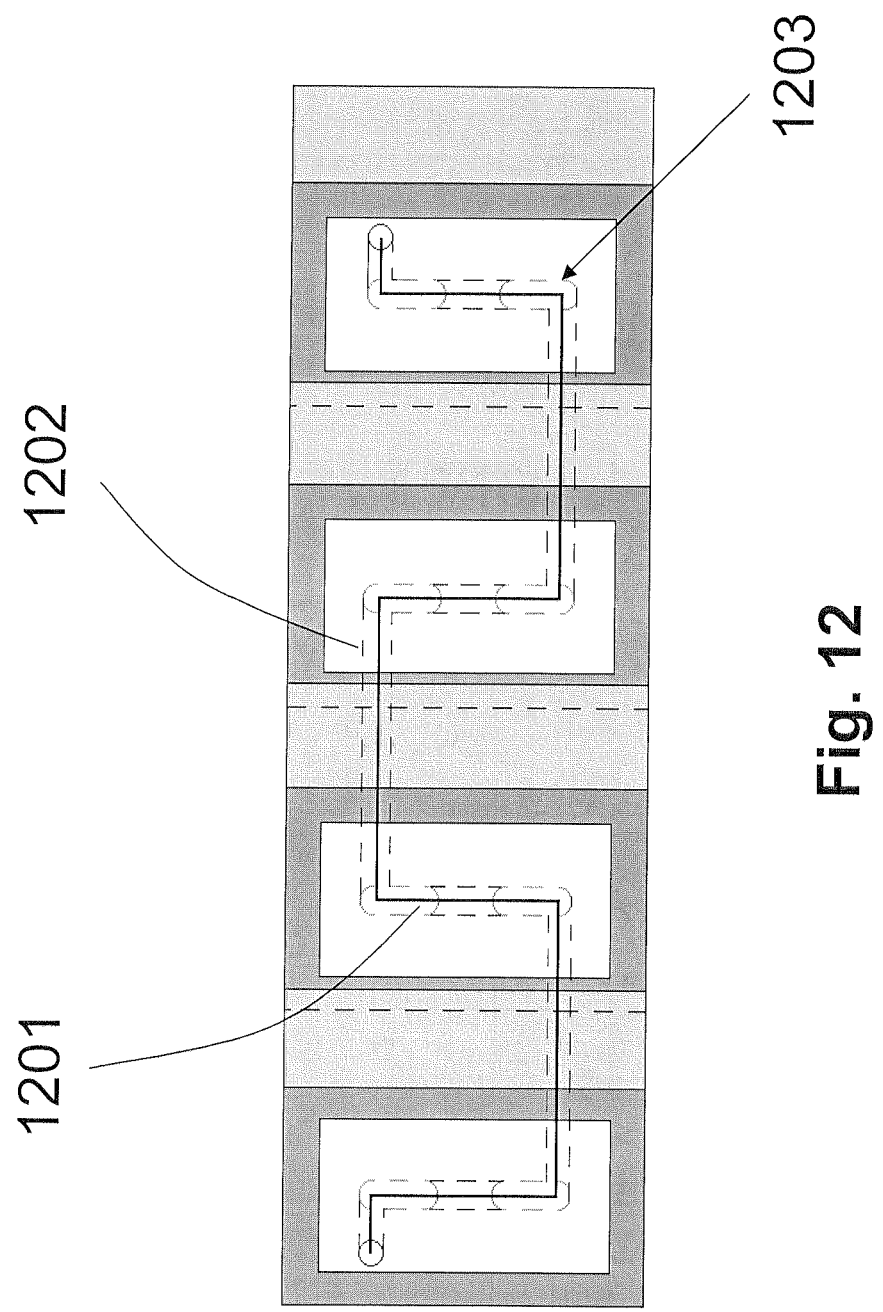
FIG. 12 illustrates a support plate used in the unit of FIG. 11.

The support plate used in the unit shown in FIG. 11 is illustrated in FIG. 12. It is suitably a sandwich of 3 layers of polymer foils bonded together by adhesives. The top layer (closest to fuel cell) was 0.1 mm foil of a plastic material that can withstand heat up to about 80° C. and which does not expand when heated, middle layer is a 0.5 mm PVC foil, bottom layer was 0.1 mm foil of the same or similar material as in the top layer. A channel, suitably 2 mm wide, is cut out in the middle layer to extend in a serpentine configuration over the whole plate and having elongated openings to each cell. The solid lines 1201 illustrate the flow path of hydrogen gas through the support plate. The dotted lines 1202 illustrate the extension, i.e. the width of the flow channels. There is also shown the elongated openings 1203 to the anode fuel cell compartments.

The support plate 1160 is attached to a metallic back plate 1170 (Al or steel), (acting also as cooling element). This backing plate is slightly bent in the direction of the longest side of the rectangular clamping plate (1007). The radius of said bending should typically be 10-25 cm.

The distance between the cells in said unit ("b" in FIG. 11) may vary. If the distance is too small the cooling of the cells may be hindered, especially at higher power levels. If the distance is too large, then the overall maximum power density will decrease due to the increased spread out of the cells. For a multiple cell unit where the distance "a" in FIG. 11 is 10-15 mm. The optimal cell distance "b" is 0.1-8 mm, preferably 1-5 mm, depending on the application and on other geometrical design parameters.

Preferably there should also be a plastic cover 1180 on top of the gold plated stainless steel clamping plates. Said plastic cover may also be "clamped down to the backing plate and contribute to the clamping force over the cells. There should also be a plastic dust filter 1190 (preferably hydrophobic) incorporated in the openings of the plastic cover 1180, said openings corresponding to the active area of the cells. The plastic cover enables the clamping plates 1110a-d to be made thinner and thereby easier to manufacture and with less materials cost.

If appropriately electrically insulated from the clamping plates said plastic cover may also be made of a metallic material or may be part of a metallic or plastic chassis of a device where said fuel cell is incorporated.

The frame member 1150 that surrounds the active area (i.e. the area of the GDLs) should preferably be made of a compressible and thermally conducting material that can transport heat to the clamping plates. Furthermore, a thermally conducting material (e.g. Gap Pad; The Bergquist Company) could be placed between the clamping plate and the plastic or metallic cover in order to improve the heat transport to the cover.

The invention will now be further illustrated by way of the following non-limiting Examples.

EXAMPLE 1

Prior Art

This describes results of a lifetime experiment made using a design of the cells according to prior art. Here the fuel cell was assembled as a 4 cell unit, each cell having a 2.25 $cm^2$ active surface. Bent plastic bars were used as the clamping means for this assembly.

The Membrane Electrode Assemblies (MEAS) used were Primea 58 from Gore (0.4 mg Pt cm$^{-2}$ cathode, 0.4 mg Pt cm$^{-2}$ anode, 18 μm thick membrane). Four pieces of MEA were used, each cut into 21 mm by 21 mm pieces. The Gas Diffusion Layer (GDL) materials used were Carbel products from Gore, with their micro-porous side turned towards the MEA to form the cathode side and E-TEK Cloth A for the anode side. All GDL materials were cut into 15 mm by 15 mm pieces.

To form the support plate, three plastic (PVC) sheets, each 0.8 mm thick, were used. These three sheets are labelled as the top, middle and bottom layer. Holes were then cut out according to a printed template on these sheets. These holes form the channels by which the hydrogen gas reaches the cell. The holes in the bottom layer were used for external gas connections. Using a double-sided tape supplied by TESA, this tape was attached to both sides of the middle layer, with holes and channels cut through this tape as well, and then attached to both the top and bottom layer, hence ending up with a three-layered support plate "sandwich".

For each cell, a copper tape (TESA, 4384) was then adhered on top of this support plate, with the electron conducting adhesive-coated side facing upwards. The adhesion to the top plate was accomplished using a double-sided tape, cutting out holes in this tape positioned according to those in the top plate. A piece of GDL material, 15 mm by 15 mm, active area 2.25 cm$^2$, was placed over the holes, thus forming the anode current collector. The MEA was then put on top of the GDL, and the surface of the MEA not covering the GDL was then sealed against the adhesive of the copper tape by softly wiping the MEA down with e.g. a smooth Teflon piece. A second piece of GDL, 15 mm by 15 mm, was then put on top of the MEA, aligned with the anode GDL, and on top of this a gold net, 15 mm by 15 mm, having a mesh of 36 holes per cm$^2$ was used.

The shape of the copper tape was cut with a jagged shape and put on top of the cathode GDL but below the gold net for this cell, and to form the anode current collector of the next cell in series.

Pure and dry hydrogen was used at the anode, while the cathode was in contact with still air atmosphere. The hydrogen flow was controlled by a mass flow meter (Brooks Instruments). The current density was controlled by means of a load cell (TTI, LD300).

The four cell unit was tested by first turning on the hydrogen flow for 15 seconds, then stepwise increasing the current every 5 seconds to reach 1 A after 5 minutes. The current was then kept at 1 A for 1 hour and 50 minutes. The current was then decreased in steps every 5 seconds to reach 0 A after 5 minutes. After this the unit was kept at 0 A with the hydrogen gas flow shut off for one hour. This test cycle was then repeated over 250 times to reach over 500 hours of operating time. The hydrogen flow, when turned on, was kept at a 100% excess in relation to the hydrogen consumed at the maximum current for the four cell unit.

The cell voltage (at 0.8 A when stepping down in current after 1 h and 50 min at 1.0 A in the run cycle) of the third cell of a four cell unit fabricated in this way during this lifetime experiment is shown below:

TABLE 1

| Time/hours | Cell voltage/V |
| --- | --- |
| 100 | 0.621 |
| 200 | 0.557 |
| 300 | 0.523 |
| 400 | 0.443 |
| 500 | 0.334 |

As can be seen, the performance of this cell in terms of voltage at 0.8 A (and thereby power output and efficiency level) is decreased by almost 50% during the experiment.

EXAMPLE 2

Cu-tape with Novel Clamping

In this example the fuel cell was assembled as a 4 cell unit, each cell having a 2.25 cm$^2$ active surface. As the clamping means for this assembly 2 screws were inserted in holes on either side of each cell, having a diameter of 3 mm. These screws penetrated through a gold-plated steel net measuring 50 mm by 18 mm having a mesh size of 9 holes per cm$^2$, with a copper tape and a plastic foam material preventing any contact between it and the GDL/MEA of the fuel cell. Screws were then inserted through this gold-plated net and in the holes drilled to achieve the clamping pressure required.

The Membrane Electrode Assemblies (MEAs) used were Primea 58 from Gore (0.4 mg Pt cm$^{-2}$ cathode, 0.4 mg Pt cm$^{-2}$ anode, 18 μm thick membrane). Four pieces of MEA were used, each cut into 21 mm by 21 mm pieces. The Gas Diffusion Layer (GDL) materials used were Carbel products from Gore, with their micro-porous side turned towards the MEA to form the cathode side and E-TEK Cloth A for the anode side. All GDL materials were cut into 15 mm by 15 mm pieces.

To form the support plate, three plastic (PVC) sheets, each 0.8 mm thick were used. These three sheets are labelled as the top, middle and bottom layer. Holes were then cut out according to a printed template on these sheets. These holes form the channels by which the hydrogen gas reaches the cell. The holes in the bottom layer were used for external gas connections. Using double-sided tape supplied by TESA, this tape was attached to both sides of the middle layer, with holes and channels cut through this tape as well, and then attached to both the top and bottom layer, hence ending up with a three-layered support plate "sandwich".

For each cell, a copper tape (TESA, 4384) was then adhered on top of this support plate, with the electron conducting adhesive-coated side facing upwards. The adhesion to the top plate was accomplished using a double-sided tape, and cutting out holes in this tape positioned according to those in the top plate. A piece of GDL material, 15 mm by 15 mm, active area 2.25 cm$^2$, was placed over the cut out holes, thus forming the anode current collector. The MEA was then put on top of the GDL, and the surface of the MEA not covering the GDL was then sealed against the adhesive by softly wiping the MEA down with e.g. a smooth Teflon piece. A second piece of GDL, 15 mm by 15 mm, was then put on top of the MEA, aligned with the anode GDL, and on top of this a gold net, 15 mm by 15 mm, having a mesh of 36 holes per cm$^2$ was used.

Surrounding the active 15 mm by 15 mm active GDL-MEA area, a 3 mm frame of plastic foam material (PORON) was placed over the MEA. The shape of a piece of copper tape was cut to follow the shape of the foam frame for this cell, and to form the anode current collector of the next cell in series. On top of the foam, but below the top-most gold net, the copper tape was placed, folded into strips so that the non-adhesive side was facing both the upper gold net and the foam below, thus forming the cathode current collector of this cell.

Pure and dry hydrogen was used at the anode, while the cathode was in contact with still air atmosphere. The hydrogen flow was controlled by a mass flow meter (Brooks Instruments). The current density was controlled by means of a load cell (TTI, LD300).

The four cell unit was tested by stepwise increasing the current every 5 seconds to reach 0.8 A after 5 minutes. The current was then kept at 0.8 A for 1 hour and 50 minutes. The current was then decreased in steps every 5 seconds to reach 0 A after 5 minutes. This test cycle was then repeated over 450 times to reach over 900 hours of operating time. The hydrogen flow was kept at a 6% excess in relation to the total amount hydrogen consumed for the whole four cell unit.

The cell voltage (at 0.8 A after 1 h and 50 min in the run cycle) of the third cell of a four cell unit fabricated in this way during this lifetime experiment is shown below:

TABLE 2

| Time/hours | Cell voltage/V |
| --- | --- |
| 100 | 0.562 |
| 200 | 0.57 |
| 300 | 0.565 |
| 400 | 0.562 |
| 500 | 0.547 |
| 600 | 0.552 |
| 700 | 0.547 |
| 800 | 0.545 |
| 900 | 0.537 |

This shows that, with the design according to Example 2 (i.e. using the plastic foam material to prevent the direct contact between the copper foil and the GDL/MEA), the performance in terms of voltage at 0.8 A has decreased with less than 5% after 900 hours, thereby showing a much better lifetime performance than that of Example 1.

EXAMPLE 3

Cu-tape+Sn

In this example a four-cell fuel cell unit was assembled as in Example 2, but with the difference that the copper tape used was coated with tin-oxide on the non-adhesive side (TESA, 4385). The orientation of the tape was also changed so that, for each cell, the tin-oxide coated side of the copper tape was facing upwards when adhered on top of the support plate. As before, holes in this tape were cut out and positioned according to those in the support plate. Using a double-sided tape from Nolato (Adhesive EAD 478), a 23 mm by 23 mm outline was cut out, with an internal square of dimensions 15 mm by 15 mm cut out within this outline. This piece of tape was then put on top of the tin-oxide tape so that the holes in the top plate were situated within the 15 mm by 15 mm cut out hole of the adhesive. A piece of GDL material, 15 mm by 15 mm, active area 2.25 cm², was placed in the 15 mm by 15 mm cut out hole, thus forming the anode current collector. The MEA, cathode GDL and clamping means were the same as in Example 2.

The four cell unit was tested by first turning on the hydrogen flow for 15 seconds, then stepwise increasing the current in steps every 5 seconds to reach 0.8 A after 5 minutes. The current was then kept at 0.8 A for 1 hour and 50 minutes. The current was then decreased in steps every 5 seconds to reach 0 A after 5 minutes. After this the unit was kept at 0 A with the hydrogen gas flow shut off for one hour. This test cycle was then repeated over 500 times to reach over 2000 hours of operating time. During the time 110 h to 1220 h the shut off period of one hour with the hydrogen flow turned off was not used. The hydrogen flow, when turned on, was kept at a 6% excess in relation to the total amount hydrogen consumed for the whole four cell unit.

The cell voltage (at 0.8 A after 1 h and 50 min in the run cycle) of the third cell of a four cell unit fabricated in this way during this lifetime experiment is shown below:

TABLE 3

| Time/hours | Cell voltage/V |
| --- | --- |
| 100 | 0.552 |
| 200 | 0.538 |
| 300 | 0.528 |
| 400 | 0.541 |
| 500 | 0.505 |
| 600 | 0.513 |
| 700 | 0.495 |
| 800 | 0.487 |
| 900 | 0.48 |
| 1000 | 0.49 |
| 1100 | 0.487 |
| 1200 | 0.454 |
| 1300 | 0.516 |
| 1400 | 0.508 |
| 1500 | 0.503 |
| 1600 | 0.493 |
| 1700 | 0.482 |
| 1800 | 0.439 |
| 1900 | 0.482 |
| 2000 | 0.472 |

This clearly shows that similar initial performance, compared to Example 2, can be reached using this new design. And that the decrease in performance regarding voltage at 0.8 A after 2000 h is less than 15%.

EXAMPLE 4

In this example, a 4 cell unit, each cell 1100a-d having a 3.84 cm² active surface is assembled and the lifetime of the unit is investigated. The variation in performance at 1 A after 30 minutes within every 50th run cycle during lifetime cycling is presented in the Table 4 below.

The clamping means 1110 of the this fuel cell was a 16 mm by 45 mm, 1 mm thick, steel plate with holes cut out resulting in a shape as shown in FIG. 10. The design of a preferred embodiment of a 4 cell unit is illustrated schematically in FIG. 11.

Here, the fuel cell of the present invention is a multiple cell unit of 4 cells. The Membrane Electrode Assemblies (MEAs) 1130a-d were Primea 5710 from Gore. Rectangular pieces, 12 mm by 32 mm, of Sigracet 34BC was used as gas diffusion layers (GDLs) on both electrodes, with their micro porous side turned towards the MEA. The anode current collector 1140 was made of a tin coated copper foil having an electron-conductive adhesive film on one side. The supplier was TESA (product no. 4385). The adhesive was based on a acrylic substance filled with silver coated polymer spheres. Between the MEA and the clamping plate 1100, surrounding the cathode GDL 1120, a 2 mm wide foam frame 1150 (outer measures 16 by 36 mm, inner measures 12 mm by 32 mm, Poron 4790-92-25041-04) was fastened using an adhesive (same measures as the foam frame, 3M F9469PC) between the MEA and foam frame. The interconnects between the cells was made by extending and folding 1 mm of the anode current collector foil 1140 and placing it between the clamping plate 1110 and the foam frame 1150b-d.

The support plate used in the unit shown in FIG. 11 is illustrated in FIG. 12. It is a sandwich of 3 layers of polymer foils bonded together by adhesives. The top layer (closest to fuel cell) was 0.1 mm foil of 'overhead film quality', i.e. a plastic material that can withstand heat up to about 80° C. and which does not expand when heated, middle layer is a 0.5 mm PVC foil, bottom layer was 0.1 mm foil of overhead film quality. A 2 mm wide channel is cut out in the middle layer as a serpentine over the whole plate and having elongated openings to each cell.

The lateral distance between each cell, that is, the distance between the clamping plates of each cell is 1 mm.

Behind the support plate a 1 mm thick stain less steel backing plate (dimensions: 45 by 67 mm) was placed as a mechanical support (acting also as cooling element). The backing plate was bent with a radius of 150 mm, so that the clamping plates were strained when being clamped down to the backing plate. The screws pulling the clamping plates and the backing plates together were made of plastic, so that the cells were not short circuited. The clamping pressure exerted by the clamping plate on the GDLs was approximately 10N/cm$^2$.

The cell was cycled using the following run cycle. First the hydrogen flow was turned on (55 ml/min) and the current was increased linearly from 0 to 1 A in 30 s. Then the cell was run at 1 A for 30 minutes. After this the hydrogen flow was turned off and the current was set to 0 A for 29 minutes and 30 seconds. The stated cycle was repeated 1150 times. Cell 1 was short-circuited with a 10 Ohm resistance at all times.

TABLE 4

| Cycle | Cell 1 (V) | Cell 2 (V) | Cell 3 (V) | Cell 4 (V) |
|---|---|---|---|---|
| 1 | 0.595 | 0.629 | 0.608 | 0.637 |
| 50 | 0.629 | 0.656 | 0.642 | 0.681 |
| 100 | 0.641 | 0.659 | 0.641 | 0.680 |
| 150 | 0.644 | 0.663 | 0.643 | 0.681 |
| 200 | 0.653 | 0.664 | 0.645 | 0.678 |
| 250 | 0.651 | 0.666 | 0.645 | 0.680 |
| 300 | 0.653 | 0.660 | 0.643 | 0.684 |
| 350 | 0.647 | 0.656 | 0.637 | 0.676 |
| 400 | 0.645 | 0.652 | 0.638 | 0.677 |
| 450 | 0.644 | 0.649 | 0.632 | 0.676 |
| 500 | 0.644 | 0.653 | 0.630 | 0.676 |
| 550 | 0.642 | 0.646 | 0.630 | 0.672 |
| 600 | 0.641 | 0.649 | 0.631 | 0.670 |
| 650 | 0.634 | 0.643 | 0.626 | 0.664 |
| 700 | 0.634 | 0.637 | 0.624 | 0.662 |
| 750 | 0.634 | 0.638 | 0.616 | 0.658 |
| 800 | 0.638 | 0.637 | 0.618 | 0.658 |
| 850 | 0.639 | 0.637 | 0.619 | 0.658 |
| 900 | 0.631 | 0.632 | 0.615 | 0.656 |
| 950 | 0.632 | 0.627 | 0.614 | 0.654 |
| 1000 | 0.629 | 0.628 | 0.612 | 0.648 |
| 1050 | 0.627 | 0.619 | 0.602 | 0.642 |
| 1100 | 0.615 | 0.603 | 0.586 | 0.609 |
| 1150 | 0.597 | 0.565 | 0.544 | 0.577 |

EXAMPLE 5

This example describes a four-cell device was fabricated. The cells were built on a plastic carrier (Makrofol DE 1-4, T=0.1 mm) in which holes for gas inlet were laser cut. On both sides of the plastic carrier an adhesive (3M F9469PC) was placed, as a sealing element, creating a support foil assembly. Each of the four cells consisted of two rectangular Sigracet 34BC gas diffusion layers (GDLs), 12 by 32 mm, resulting in a 3.84 cm$^2$ active surface. The membrane electrode assemblies (MEAs) were Primea 5710 from Gore. Rectangular pieces, 16 by 36 mm, were used. The anode current collectors were made of a tin coated copper foil having an electron-conductive adhesive film on one side. The supplier was TESA (product no. 4385). The adhesive was based on a silver filled acrylic substance. The adhesive side was placed upwards and the GDL and MEA were fastened on its surface. Gold plated (2 µm) 2331 steel, 0.8 mm thick and 16 by 36 mm, were used as both cathode current collectors and clamping plates. The clamping plate pattern is illustrated in FIG. 10. Between the MEA and the gold plated clamping plates, surrounding the cathode GDL, a 2 mm wide foam frame (outer measures 16 by 36 mm, inner measures 12 mm by 32 mm, Poron 4790-92-25041-04) was fastened using an adhesive (same measures as the foam frame, 3M F9469PC) between the MEA and foam frame. The interconnects between the cells were made by extending and folding 1 mm of the anode current collector foil and placing it between the gold plated clamping plate and the foam frame of the adjacent cell. The distance between the cells was 1 mm.

The device was placed on a backing plate, comprising a curved surface which included gas channels and gas in- and outlet from the bottom side. The cells were cycled using the following run cycle.

First the hydrogen flow was turned on (55 ml/min) and the open circuit potential was registered. Then an activation step took place in which the voltage quickly was altered between 3.2 and 1V for 15 minutes. A polarization sequence followed where the potential was swept from 3.4V to 2V for 1 hour while the current was registered. 10 polarization sequences were completed The performance of this cell during the 10th polarization sequence is shown in the polarization curve of FIG. 13., plot: A ▬ ·· ▬ ·· ▬ ·

EXAMPLE 6

Using the design of this invention, illustrated in FIG. 5b and discussed in Example 5, there are several improvements that are possible from a cost perspective. In this example a 4-cell unit described in Example 5 has been improved by: 1) turning the electrically conducting tape (type TESA 4385) with the Sn-coated copper foil upside down so that the conducting adhesive is not facing the anode GDL. Instead the anode GDL was in direct contact with the Sn-coated foil and in the sealing area surrounding the active area a non-conductive adhesive was used (3M F9469PC), 2) the cells were separated so that the distance between the clamping plates of the 4-cell unit was increased from 1 to 5 mm. This was made possible by prolonging the part of the foil that is connecting the cells, 3) the width of the frame member surrounding the active area was decreased from 2 to 1 mm, so that the ratio active area/total area was increased (i.e. the GDL dimensions was 14×34 mm). The design improvements were tested both separately and combined.

Figure 13:
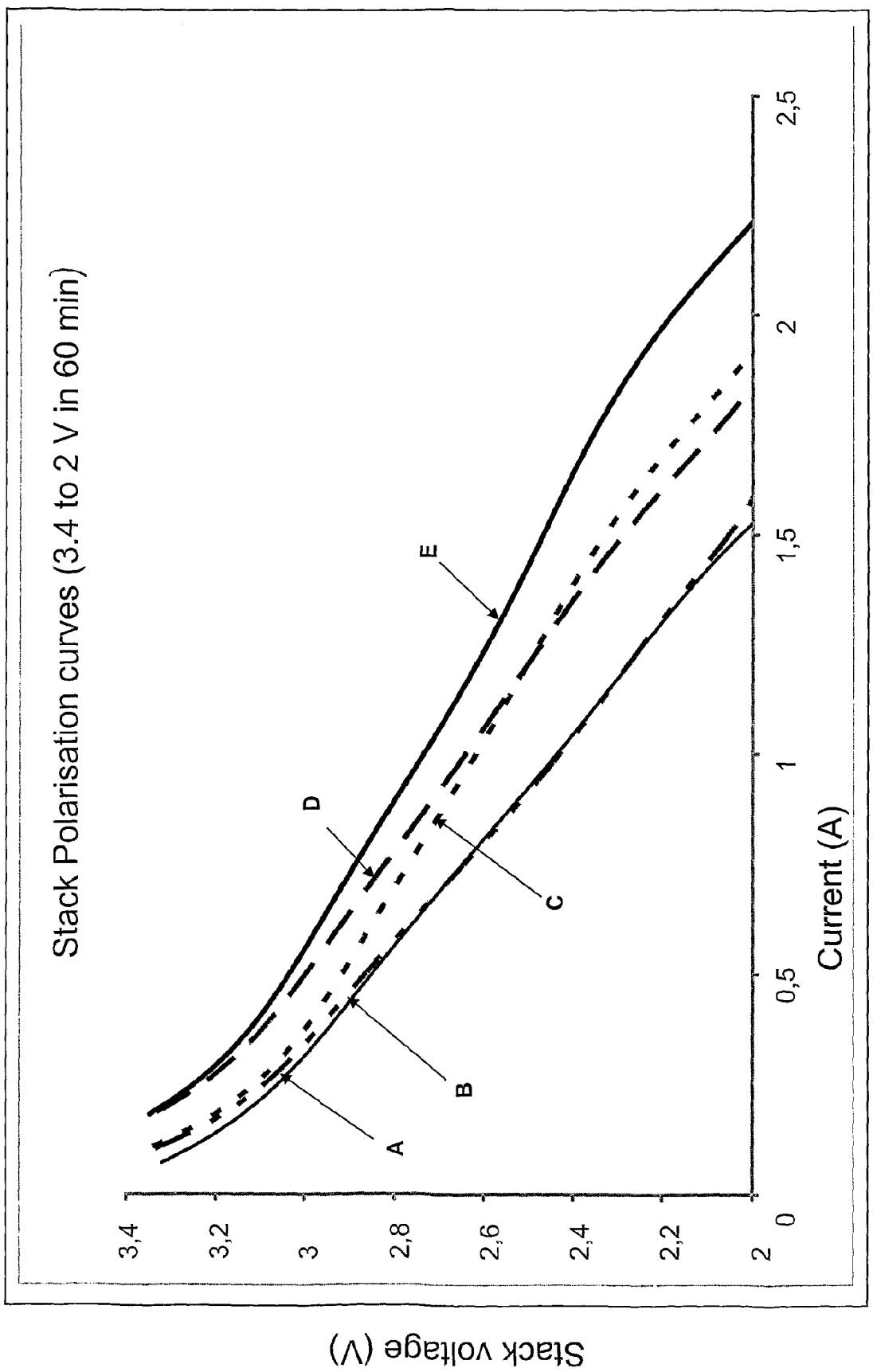
FIG. 13 is a graph showing polarization curves of different four-cell units.

The performance curves of these cells during the 10th polarization sequence are given in FIG. 13:
1) B Turning the Sn-coated Cu tape: ▬▬▬▬▬
2) C Increasing distance between cells: ▬ ▬ ▬ ▬ ▬
3) D Decreasing frame width: ▬ ▬ ▬ ▬ ▬
4) E All changes combined: ▬▬▬▬▬

Curve B shows similar performance as Curve A indicating that the current collector foil contact resistance to the anode GDL is the same with or without the conducting adhesive.

Curve C has the same performance as curve A and B at low currents, since it has the same active area. However, at high currents this 4-cell unit shows better performance than A and B because of the larger distance between the cells which gives better heat dissipation/cooling of the fuel cell assembly.

Curve D shows higher performance than A, B, and C at low currents due to the higher active area in that unit. However, at high currents the performance is not better than curve C. Thus, the C-unit has better heat dissipation.

Curve E is showing the performance of a unit with all changes combined. This has the best performance of all curves.

The invention claimed is:

1. An arrangement for interconnecting electrochemical cells, comprising:
    a plurality of electrochemical cells, each of the electrochemical cells comprising
        an anode gas diffusion layer;
        a cathode gas diffusion layer;
        a membrane electrode assembly interposed between the anode gas diffusion layer and the cathode gas diffusion layer;
        first anode and second cathode current collectors coupled to the anode and cathode gas diffusion layers, respectively, the first anode current collector extending from an anode side of one cell to a cathode side of an adjacent cell, cell components being clamped together, the first anode current collector in contact with the anode gas diffusion layer of a first electrochemical cell being configured to be connected to the cathode side of a second, adjacent electrochemical cell via the second cathode current collector, wherein the second cathode current collector is an inert and electrically conductive member; and
    an insulating element interposed between the first anode current collector of the first cell and the cathode side of the membrane electrode assembly of the second, adjacent cell, the insulating element comprising an insulating spacer member having a top surface and a bottom surface, the bottom surface of the spacer member being in contact with a portion of the membrane electrode assembly of the second cell,
    wherein the inert and electrically conductive member clamps the first anode current collector against the spacer member, such that the bottom surface of the spacer member presses the portion of the membrane electrode assembly of the second, adjacent cell down to the anode current collector of the second, adjacent cell,
    the first anode current collector has an extended portion in contact with the top surface of the spacer member when clamped,
    electrical connection is provided by the inert and electrically conductive member, and
    the spacer member is disposed in relation to the cathode gas diffusion layer and provides electrochemical insulation between the first anode current collector and electrochemically active components of the adjacent cell.

2. The arrangement as claimed in claim 1, wherein at least the top surface of the insulating element is hydrophobic to avoid film formation of condensed water.

3. The arrangement as claimed in claim 1, wherein the spacer member is provided as a frame surrounding the cathode gas diffusion layer.

4. The arrangement as claimed in claim 1, wherein the spacer member is made of a compressible material.

5. The arrangement as claimed in claim 1, wherein the spacer member is made of a rigid, essentially non-compressible material having a well defined thickness adapted to the thickness of the cell to which the spacer member is attached.

6. The arrangement as claimed in claim 1, wherein the first anode current collector is an electrically conductive foil made of metal or a carbon-based material.

7. The arrangement as claimed in claim 6, wherein the anode current collector foil is partially covered with a layer preventing the electrochemical contact between the foil and the cathode gas diffusion layer or the membrane electrode assembly.

8. The arrangement as claimed in claim 6, wherein the electrically conductive foil is provided with electrically conductive adhesive over the entire side facing away from the anode gas diffusion layer and the membrane electrode assembly.

9. The arrangement as claimed in claim 8, wherein the electrically conductive foil is a copper foil that is coated with tin on at least one side.

10. The arrangement as claimed in claim 9, wherein the tin coated copper foil is only covered with adhesive in regions for sealing.

11. The arrangement as claimed in claim 9, wherein the region not coated with adhesive is in direct contact with the anode gas diffusion layer.

12. The arrangement as claimed in claim 1, wherein the distance between cells in the assembly is 0.1-8 mm.

13. A fuel cell assembly, comprising a plurality of fuel cells interconnected with an arrangement as claimed in claim 1.

14. The arrangement as claimed in claim 1, wherein the spacer member is disposed between the membrane electrode assembly of the second cell and the extended portion of the first anode current collector when clamped.

15. The arrangement as claimed in claim 1, wherein the extended portion of the first anode current collector includes a first portion extending between the first cell and the second cell, and a second portion extending from the first portion, the second portion of the first anode current collector contacting the top surface of the spacer member.

* * * * *